US012532165B2

(12) United States Patent
Jost

(10) Patent No.: US 12,532,165 B2
(45) Date of Patent: Jan. 20, 2026

(54) KEY DISTRIBUTION FOR HOP BY HOP SECURITY IN IAB NETWORKS

(71) Applicant: Telefonaktiebolaget LM Ericsson (publ), Stockholm (SE)

(72) Inventor: Christine Jost, Dalby (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 1040 days.

(21) Appl. No.: 17/620,116

(22) PCT Filed: Jun. 4, 2020

(86) PCT No.: PCT/EP2020/065419
§ 371 (c)(1),
(2) Date: Dec. 17, 2021

(87) PCT Pub. No.: WO2020/254113
PCT Pub. Date: Dec. 24, 2020

(65) Prior Publication Data
US 2025/0184724 A1 Jun. 5, 2025

Related U.S. Application Data

(60) Provisional application No. 62/862,313, filed on Jun. 17, 2019.

(51) Int. Cl.
*H04M 1/66* (2006.01)
*H04W 12/043* (2021.01)
(Continued)

(52) U.S. Cl.
CPC ....... *H04W 12/043* (2021.01); *H04W 12/106* (2021.01); *H04W 76/10* (2018.02); *H04W 88/08* (2013.01)

(58) Field of Classification Search
CPC ..... H04W 12/02; H04W 12/03; H04W 12/06; H04W 12/069; H04W 12/12;
(Continued)

(56) References Cited

U.S. PATENT DOCUMENTS 7,702,925 B2    4/2010  Northcutt et al.
8,555,064 B2 *  10/2013 Suh ........................ H04L 63/205
                                                                713/168
(Continued)

FOREIGN PATENT DOCUMENTS

EP    2293515 A1    3/2011
EP    2416521 A1    2/2012

OTHER PUBLICATIONS

International Search Report and Written Opinion for International Application No. PCT/EP2020/065419 dated Jul. 24, 2020, 11 pages.
(Continued)

*Primary Examiner* — Shantell L Heiber
(74) *Attorney, Agent, or Firm* — Sage Patent Group

(57) ABSTRACT

A method by an integrated access and backhaul, IAB, node and an IAB node for securely communicating with at least one second IAB node is provided. A connection is established a connection with a donor IAB node of a network. A first message including a symmetric key to use in securely communicating with the at least one second IAB node is received from the donor IAB node. A second message is transformed into a secure message using the symmetric key and a message protection algorithm. The secure message is transmitted to the at least one second IAB node.

20 Claims, 12 Drawing Sheets

(51) Int. Cl.
*H04W 12/106* (2021.01)
*H04W 76/10* (2018.01)
*H04W 88/08* (2009.01)

(58) Field of Classification Search
CPC . H04W 12/043; H04W 76/10; H04W 12/106; H04W 12/0431; H04L 63/062; H04L 9/14
See application file for complete search history.

(56) References Cited

U.S. PATENT DOCUMENTS

| | | | |
|---|---|---|---|
| 2013/0055383 A1* | 2/2013 | Shaffer | H04L 63/1441 726/22 |
| 2016/0150449 A1* | 5/2016 | He | H04W 12/10 370/331 |
| 2019/0103966 A1* | 4/2019 | Zimny | H04W 12/0433 |
| 2019/0320318 A1* | 10/2019 | Lehtovirta | H04L 63/205 |
| 2020/0266989 A1* | 8/2020 | Krcmaricic-Barackov | H04L 9/30 |
| 2020/0267801 A1* | 8/2020 | Jung | H04W 76/11 |
| 2020/0404740 A1* | 12/2020 | Malkamäki | H04W 76/40 |
| 2021/0259051 A1* | 8/2021 | Latheef | H04W 76/12 |

OTHER PUBLICATIONS

"Chapter 13: Key Management Techniques ED—Menezes A J; Van Oorschot P C; Vanstone S A", Handbook of Applied Cryptography; [CRC Press Series on Discrete Mathematices and Its Applications], —CRC Press, Boca Raton, FL, US, XP001525013, pp. 543-590.
Examination Report for Indian Patent Application No. 202247001969, mailed Jul. 26, 2022, 6 pages.

* cited by examiner

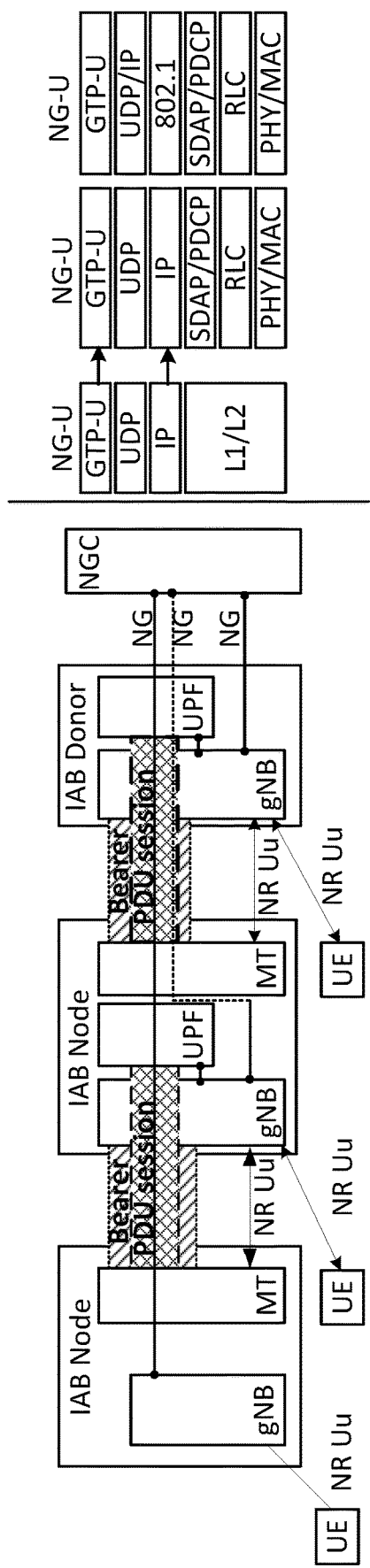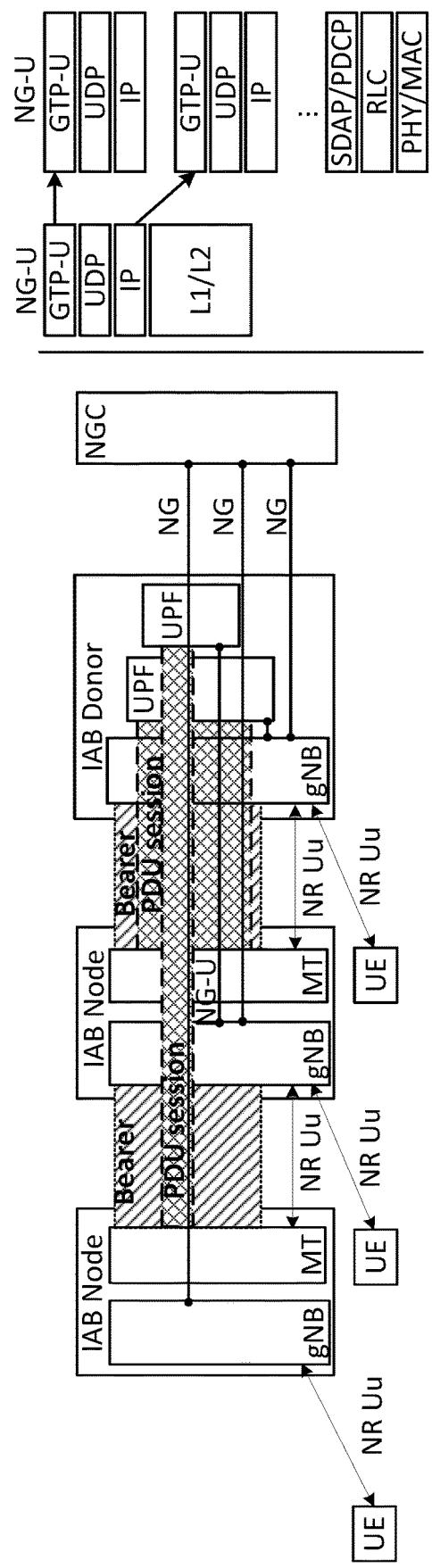
Figure 2C
Figure 2D

KEY DISTRIBUTION FOR HOP BY HOP SECURITY IN IAB NETWORKS

CROSS REFERENCE TO RELATED APPLICATIONS

This application is a 35 U.S.C. § 371 national stage application of PCT International Application No. PCT/EP2020/065419 filed on Jun. 4, 2020, which in turns claims domestic priority to U.S. Provisional Patent Application No. 62/862,313, filed on Jun. 17, 2019, the disclosures and content of which are incorporated by reference herein in their entirety

TECHNICAL FIELD

The present disclosure is related to communication systems and more particularly to how messages are securely communicated between integrated access and wireless access backhaul nodes.

BACKGROUND

3GPP is studying potential solutions for efficient operation of integrated access and wireless access backhaul (IAB) in new radio (NR) also known as relaying where the NR radio base station (called IAB node) provide access to end user UEs (wireless devices) and at the same time uses wireless backhaul to connect to another NR base station.

IAB strives to use existing functions and interfaces defined for access. In particular, Mobile-Termination (MT), generation node B distributed unit, gNB-DU, generation node B central unit, gNB-CU, user plane function, UPF, access and mobility function, AMF, and session management function, SMF, as well as the corresponding interfaces NR Uu (between MT and gNB), F1, NG, X2 and N4 may be used as baseline for the IAB architectures. Modifications and/or enhancements to these functions and interfaces for the support of IAB will be explained in the context of the architecture discussion. Additional functionality such as multi-hop forwarding is included in the architecture discussion as it is necessary for the understanding of IAB operation.

The Mobile-Termination (MT) function has been defined as a component of the Mobile Equipment. In the context of this study, MT is referred to as a function residing on an IAB-node that terminates the radio interface layers of the backhaul Uu interface toward the IAB-donor or other IAB-nodes.

FIG. 1 shows a reference diagram for IAB in standalone mode, which contains one IAB-donor and multiple IAB-nodes. The IAB-donor may be treated as a single logical node that comprises a set of functions such as gNB-DU, gNB-CU control plane, gNB-CU-CP, gNB-CU user plane, gNB-CU-UP and potentially other functions. In a deployment, the IAB-donor can be split according to these functions, which can all be either collocated or non-collocated as allowed by 3GPP NG-RAN architecture. IAB-related aspects may arise when such split is exercised.

FIGS. 2A-2E illustrate architectures studied to implement IAB. 3GPP TR 38.874 provides further details of these architectures. The differences between these architectures were analyzed during a study item phase of IAB specifications, A decision was made to standardize using the architecture illustrated in FIG. 2A. The proposed user plane (UP) and control plane (CP) protocol stacks for the selected architecture is shown in FIGS. 3 and 4.

As shown in FIGS. 3 and 4, the chosen protocol stacks reuse the current CU-DU split specification in rel-15, where the full F1-U (GTP-U/UDP/IP) is terminated at the IAB node (like a normal DU) and the full F1-C(F1-AP/SCTP/IP) is also terminated at the IAB node (like a normal DU). In the above cases, Network Domain Security (NDS) has been employed to protect both UP and CP traffic (IPsec in the case of UP, and datagram transport layer security, DTLS, in the case of CP). IPsec could also be used for the CP protection instead of DTLS.

One commonality between the CP and UP protocol stacks is that a new layer, called adaptation layer (and abbreviated as "Adapt" in FIGS. 3 and 4), has been introduced in the intermediate IAB nodes and the IAB donor, which is used for routing of packets to the appropriate downstream/upstream node and also mapping the UE bearer data to the proper backhaul RLC channel (and also between backhaul RLC channels in intermediate IAB nodes) to satisfy the end to end QoS requirements of bearers.

Some highlights about the operation of the transmitter and receiver side shall ben described.
PDCP (Packet Data Convergence Protocol)

The PDCP entity receives PDCP service data units, SDUs, from higher layers and these SDUs may be assigned a Sequence Number, SN, and be delivered to lower layers (i.e. radio link control, RLC). The discardTimer is started at the time a PDCP SDU is received. When the discardTimer expires, the PDCP SDU is discarded and a discard indication is sent to lower layers. The RLC, when possible, will then discard the RLC SDU.

In the receiver side, the PDCP entity starts the t-reordering when it receives packets that are out-of-order. When the t-reordering expires, the PDCP entity updates the variable RX_DELIV, which indicates the value of the first PDCP SDU not delivered to the upper layers, i.e., the variable RX_DELIV indicates the lower side of the receiving window.
RLC In the transmitter side, when an RLC SDU is received from higher layers a SN is associated to it. The transmitter may set the poll bit to request the receiver side to transmit a status report. When this poll bit is set, the t-pollRetransmit timer is started. Upon expiration of this timer, the transmitter will set again the poll bit and may further retransmit those protocol data units, PDUs, which were awaiting to be acknowledged.

The receiver, on the other hand, may start the t-reassembly when RLC PDUs are not received in sequence. The t-reassembly function is similar as the t-reordering in PDCP. The timer is started when there is a SN gap i.e. a RLC PDU is missing. When t-reassembly expires, for AM, the receiver will transmit a status report to trigger a retransmission in the transmitter side.
MAC When the UE has data to be transmitted, it will request for a grant by means of the SR or BSR.

SUMMARY

In backhaul failure recovery, flow control, etc., there may be a need to send a control message directly between two IAB nodes. There is no specified interface between the IAB nodes (i.e. DUs). Thus, it is likely that these messages are sent by including message information in an adaptation layer header or using other lower layer mechanisms, such as a MAC CE (MAC control element), which currently does not support any security mechanisms.

The problem with including message information via adaptation layer header or using other lower layer mechanism is that the messages are not secure, and an intruder/attacker can sabotage the system. For example, an intruder can inject a fake packet that indicates a backhaul link failure and force an IAB node to perform re-establishment to another node. An intruder may inject a flow control message to an IAB node, forcing the IAB node to stop or throttle its UL transmission (and corresponding SRs/BSR) to a parent node. These examples of attacks can cause severe disturbances to the end user service.

Since the IAB node aggregates the data for several UEs (and also other IAB nodes), ensuring that control signaling such as backhaul link failure indications and flow control are secure prevents an intruder from being able to cause the loss of connection or degradation of performance of a multitude of UEs.

According to some embodiments of inventive concepts, a method is provided by a first integrated access and backhaul (IAB) node for securely communicating with at least one second IAB node. The method includes establishing a connection with a donor IAB node of a network. The method further includes receiving, from the donor IAB node, a first message including a symmetric key to use in securely communicating with the at least one second IAB node. The method further includes transforming a second message into a secure message using the symmetric key and a message protection algorithm. The method further includes transmitting the secure message to the at least one second IAB node.

According to other embodiments of inventive concepts, an IAB node is provided that performs analogous operations of the operations described above.

A potential advantage provided is that mechanisms for IAB nodes to communicate directly with each other in a secure way prevents attacks against the IAB nodes. The mechanisms preventing the attacks reduce the severity of consequences to end users served by the IAB nodes.

According to some other embodiments of inventive concepts, a method is provided by a donor integrated access and backhaul (IAB) node of a network for securely communicating with a first IAB node and a second IAB node. The method includes establishing a first connection with the first IAB node. The method further includes establishing a second connection with the second IAB node. The method further includes deriving a symmetric key for the second IAB node to use in securely communicating with the first IAB node based on an access stratum, AS, security context of the first IAB node. The method further includes transmitting, to the second IAB node, a protected message comprising the symmetric key.

According to other embodiments of inventive concepts, a donor IAB node is provided that performs analogous operations of the operations described above.

BRIEF DESCRIPTION OF THE DRAWINGS

The accompanying drawings, which are included to provide a further understanding of the disclosure and are incorporated in and constitute a part of this application, illustrate certain non-limiting embodiments of inventive concepts. In the drawings:

FIGS. 2A-2E are block diagrams illustrating potential architectures to implement IAB;

DETAILED DESCRIPTION

Inventive concepts will now be described more fully hereinafter with reference to the accompanying drawings, in which examples of embodiments of inventive concepts are shown. Inventive concepts may, however, be embodied in many different forms and should not be construed as limited to the embodiments set forth herein. Rather, these embodiments are provided so that this disclosure will be thorough and complete, and will fully convey the scope of present inventive concepts to those skilled in the art. It should also be noted that these embodiments are not mutually exclusive. Components from one embodiment may be tacitly assumed to be present/used in another embodiment.

The following description presents various embodiments of the disclosed subject matter. These embodiments are presented as teaching examples and are not to be construed as limiting the scope of the disclosed subject matter. For example, certain details of the described embodiments may be modified, omitted, or expanded upon without departing from the scope of the described subject matter. For example, some of the functions presently associated with the IAB-donor or the IAB node may be moved outside of the donor or node in case it becomes evident that they do not perform IAB-specific tasks.

Figure 11:
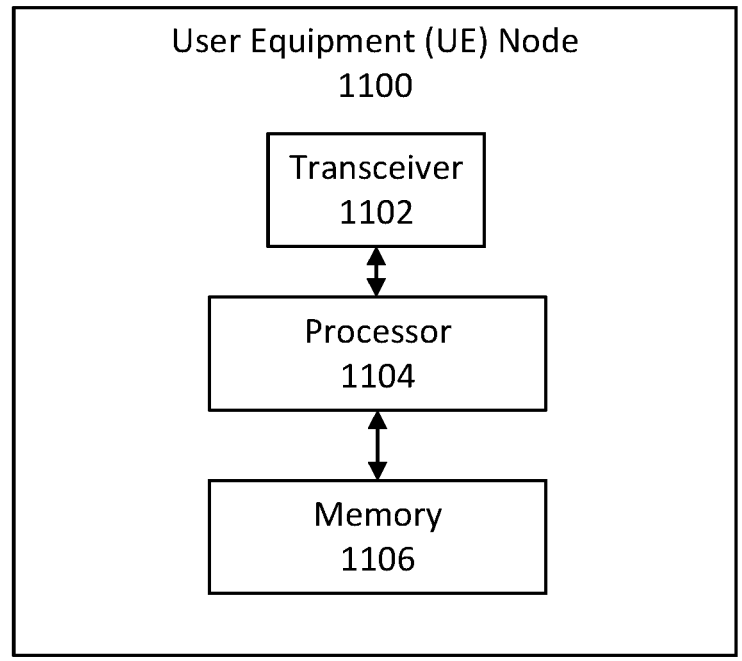
FIG. 11 is a block diagram of user equipment node in accordance with some embodiments of inventive concepts.

FIG. 11 depicts an example of a UE 1100 of a wireless communication network configured to provide wireless communication according to embodiments of inventive concepts. As shown, the UE 1100 may include a transceiver circuitry 1102 (also referred to as a transceiver) including a transmitter and a receiver configured to provide uplink and downlink radio communications with wireless devices. The UE 1100 may also include a processor circuitry 1104 (also referred to as a processor) coupled to the transceiver circuitry 1102, and a memory circuitry 1106 (also referred to as memory) coupled to the processor circuitry 1104. The memory circuitry 1106 may include computer readable program code that when executed by the processor circuitry 1104 causes the processor circuit to perform operations according to embodiments disclosed herein. According to other embodiments, processor circuitry 1104 may be defined to include memory so that a separate memory circuit is not required.

As discussed herein, operations of the UE 1100 may be performed by processor circuitry 1104 and/or transceiver circuitry 1102. For example, the processor circuitry 1104 may control transceiver circuitry 1102 to transmit uplink communications through transceiver 1102 over a radio interface to one or more network nodes and/or to receive downlink communications through transceiver circuitry 1102 from one or more network nodes over a radio interface. Moreover, modules may be stored in memory circuitry 1106, and these modules may provide instructions so that when instructions of a module are executed by processor circuitry 1104, processor circuitry 1104 performs respective operations (e.g., operations discussed herein with respect to example embodiments).

Accordingly, a UE 1100 according to some embodiments includes a processor circuitry 1104, a transceiver circuitry 1102 coupled to the processor circuitry 1104, and a memory circuitry 1106 coupled to the processor circuitry, the memory circuitry including machine readable program instructions that, when executed by the processor circuitry, cause the UE to perform operations.

Figure 12:
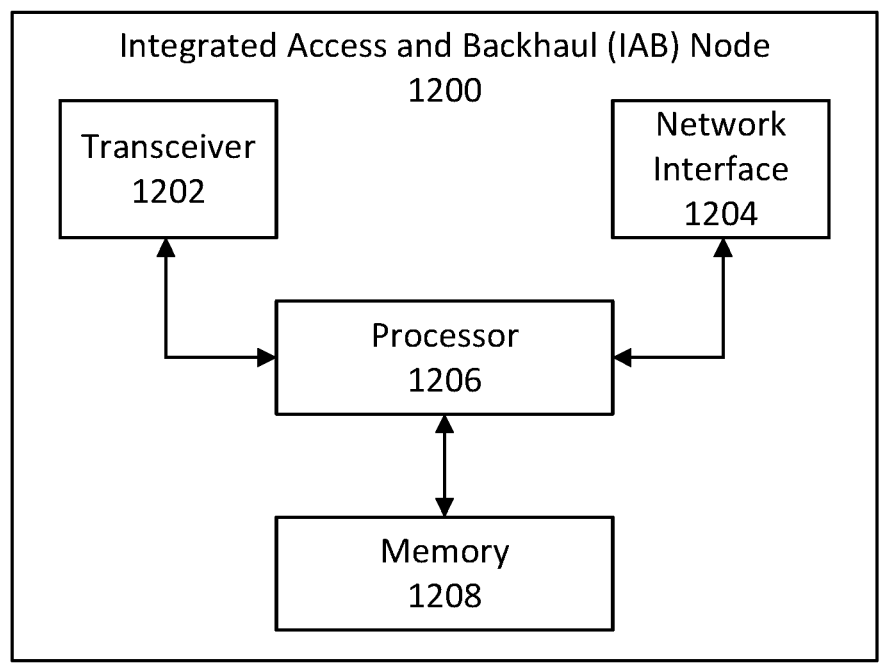
FIG. 12 is a block diagram of an IAB node in accordance with some embodiments of inventive concepts.

FIG. 12 is a block diagram of an IAB node according to some embodiments. Various embodiments provide an IAB node that includes a processor circuit 1206 a transceiver 1202 coupled to the processor circuit, and a memory 1208 coupled to the processor circuit. The memory 1208 includes machine-readable computer program instructions that, when executed by the processor circuit, cause the processor circuit to perform some of the operations depicted in FIGS. 13-16.

FIG. 12 depicts an example of an IAB node 1200 (also referred to as a base station, eNB, eNodeB, gNB, gNodeB, etc.) of a communication network configured to provide communication according to embodiments of inventive concepts. The IAB node 1200 may correspond to a central unit, a radio unit or a combination of a central unit and a radio unit in a RAN node. As shown, IAB node 1200 may include a transceiver circuit 1202 (also referred to as a transceiver) including a transmitter and a receiver configured to provide uplink and downlink radio communications with wireless devices. The IAB node 1200 may include a network interface circuit 1204 (also referred to as a network interface) configured to provide communications with other nodes (e.g., with other IAB nodes, base stations and/or core network nodes) of the wireless communication network. The IAB node 1200 may also include processor circuitry 1206 (also referred to as a processor) coupled to the transceiver circuit 1202, and a memory circuit 1208 (also referred to as memory) coupled to the processor circuit 1206. The memory circuit 1208 may include computer readable program code that when executed by the processor circuitry 1206 causes the processor circuitry to perform operations according to embodiments disclosed herein. According to other embodiments, processor circuitry 1206 may be defined to include memory so that a separate memory circuit is not required.

As discussed herein, operations of the IAB node 1200 may be performed by processor circuitry 1206, network interface 1204, and/or transceiver 1202. For example, processor circuitry 1206 may control transceiver 1202 to transmit downlink communications through transceiver 1202 over a radio interface to one or more UEs and/or to receive uplink communications through transceiver 1202 from one or more UEs over a radio interface. Similarly, processor 1206 may control network interface 1204 to transmit communications through network interface 1204 to one or more other IAB nodes and/or to receive communications through network interface from one or more other IAB nodes. Moreover, modules may be stored in memory 1208, and these modules may provide instructions so that when instructions of a module are executed by processor 1206, processor 1206 performs respective operations (e.g., operations discussed below with respect to example embodiments). Moreover, IAB nodes discussed herein may be implemented as virtual IAB nodes.

Figure 14:
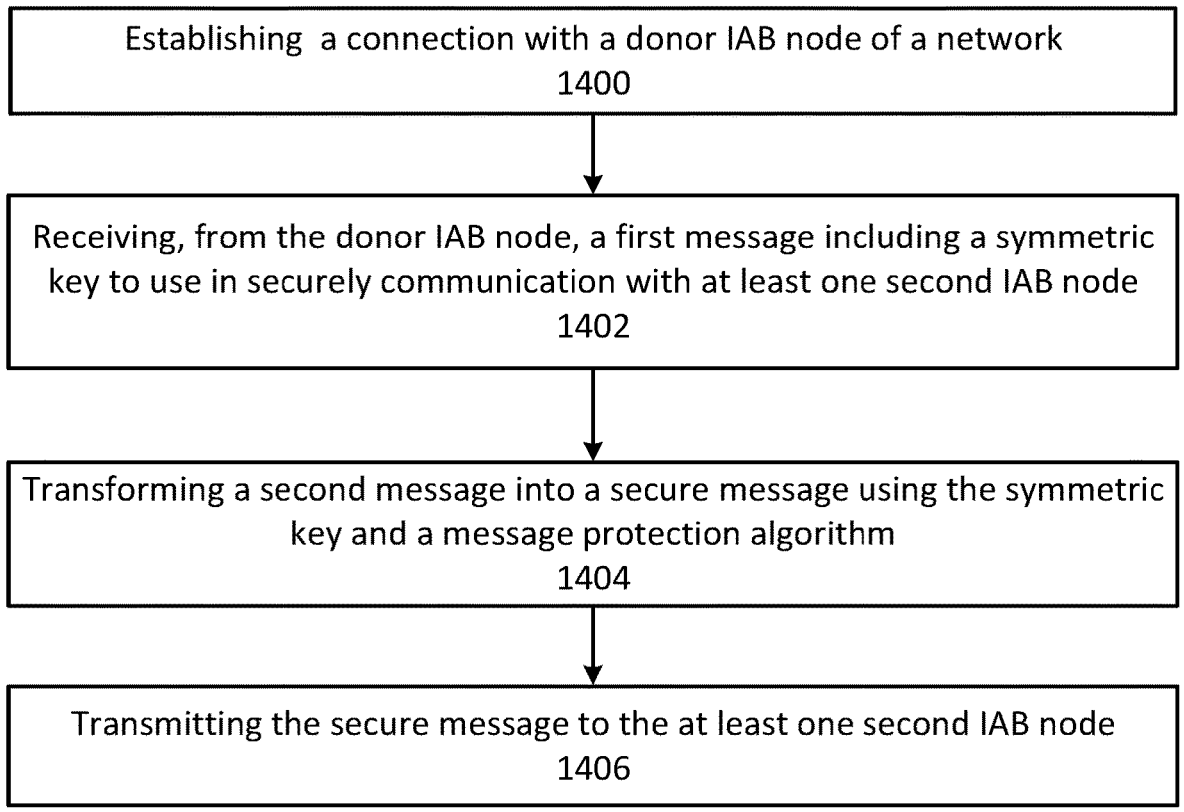
FIG. 14 is a flow chart illustrating an embodiment of securing messages between IAB nodes in accordance with some embodiments of inventive concepts.
Figure 15:
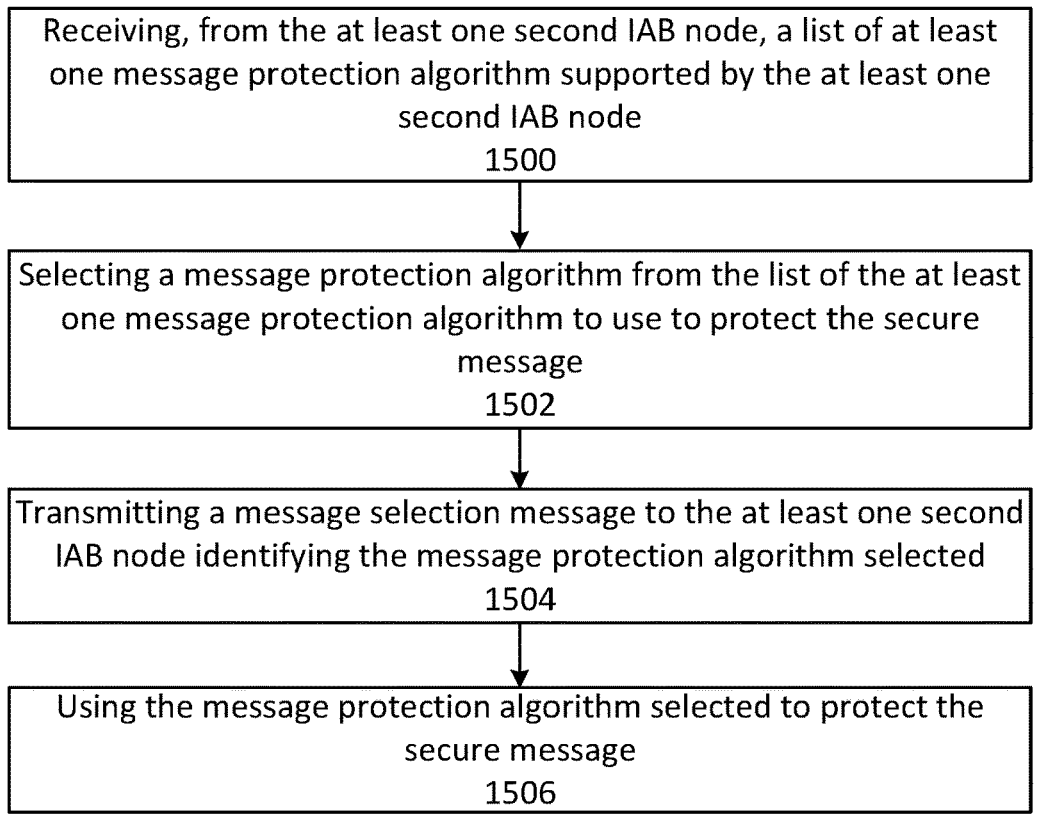
FIG. 15 is a flow chart illustrating an embodiment of securing messages between IAB nodes based on selection of a message protection algorithm in accordance with some embodiments of inventive concepts.
Figure 16:
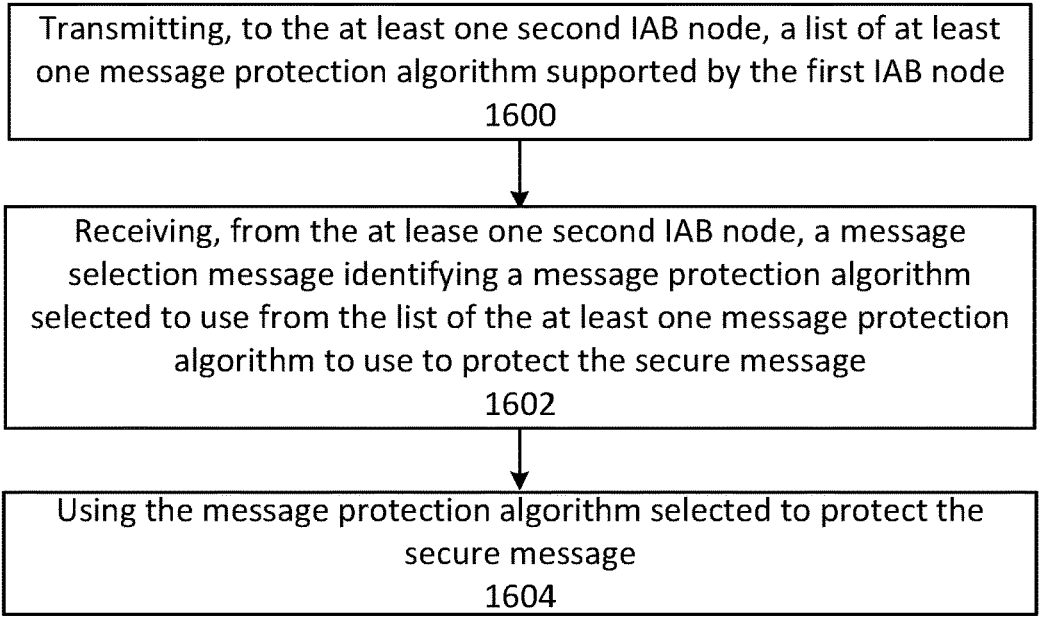
FIG. 16 is a flow chart illustrating an embodiment of securing messages between IAB nodes based on selection of a message protection algorithm in accordance with some embodiments of inventive concepts.

Accordingly, an IAB node 1200 according to some embodiments includes a processor circuit 1206, a transceiver 1202 coupled to the processor circuit, and a memory 1208 coupled to the processor circuit, the memory including machine readable program instructions that, when executed by the processor circuit, cause the IAB node 1200 to perform operations depicted in FIGS. 14-16.

Figure 13:
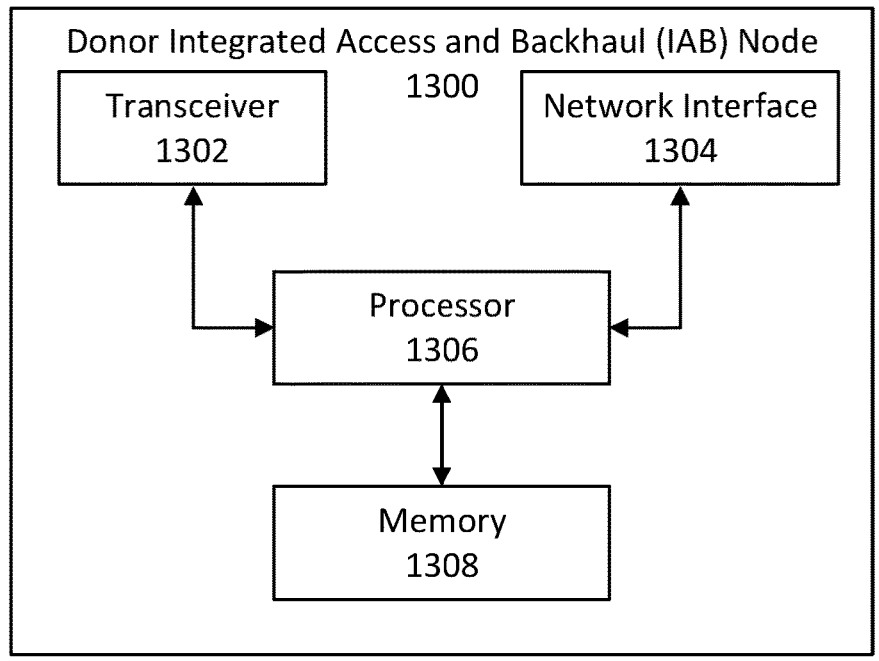
FIG. 13 is a block diagram of a donor IAB node in accordance with some embodiments of inventive concepts.

FIG. 13 is a block diagram of a donor IAB node 1300 according to some embodiments. Various embodiments provide a donor IAB node 1300 that includes a processor circuitry 1306 a transceiver circuitry 1302 coupled to the processor circuitry, and a memory circuitry 1308 coupled to the processor circuitry. The memory circuitry 1308 includes machine-readable computer program instructions that, when executed by the processor circuitry 1306, cause the processor circuitry 1306 to perform some of the operations depicted in FIG. 17.

FIG. 13 depicts an example of a donor IAB node 1300 of a communication network configured to provide communication according to embodiments of inventive concepts. As shown, donor IAB node 1300 may include a transceiver circuitry 1302 (also referred to as a transceiver) including a transmitter and a receiver configured to provide uplink and downlink radio communications with wireless devices. The donor IAB node 1300 may include a network interface circuitry 1304 (also referred to as a network interface) configured to provide communications with other nodes (e.g., with other IAB nodes, base stations and/or core network nodes) of the wireless communication network. The donor IAB node 1300 may also include processor circuitry 1306 (also referred to as a processor) coupled to the transceiver circuitry 1302, and a memory circuitry 1308 (also referred to as memory) coupled to the processor circuitry 1306. The memory circuitry 1308 may include computer readable program code that when executed by the processor circuitry 1306 causes the processor circuitry to perform operations according to embodiments disclosed herein. According to other embodiments, processor circuitry 1306 may be defined to include memory so that a separate memory circuit is not required.

As discussed herein, operations of the donor IAB node 1300 may be performed by processor circuitry 1306, network interface circuitry 1304, and/or transceiver circuitry 1302. For example, processor circuitry 1306 may control transceiver circuitry 1302 to transmit downlink communications through transceiver circuitry 1302 over a radio interface to one or more IAB nodes and/or to receive uplink communications through transceiver circuitry 1302 from one or more IAB nodes over a radio interface. Similarly, processor circuitry 1306 may control network interface circuitry 1304 to transmit communications through network interface circuitry 1304 to one or more other donor IAB nodes and/or to receive communications through network interface from one or more other donor IAB nodes. Moreover, modules may be stored in memory circuitry 1308, and these modules may provide instructions so that when instructions of a module are executed by processor circuitry 1306, processor circuitry 1306 performs respective operations (e.g., operations discussed below with respect to example embodiments). Moreover, donor IAB nodes discussed herein may be implemented as virtual donor IAB nodes.

Figure 17:
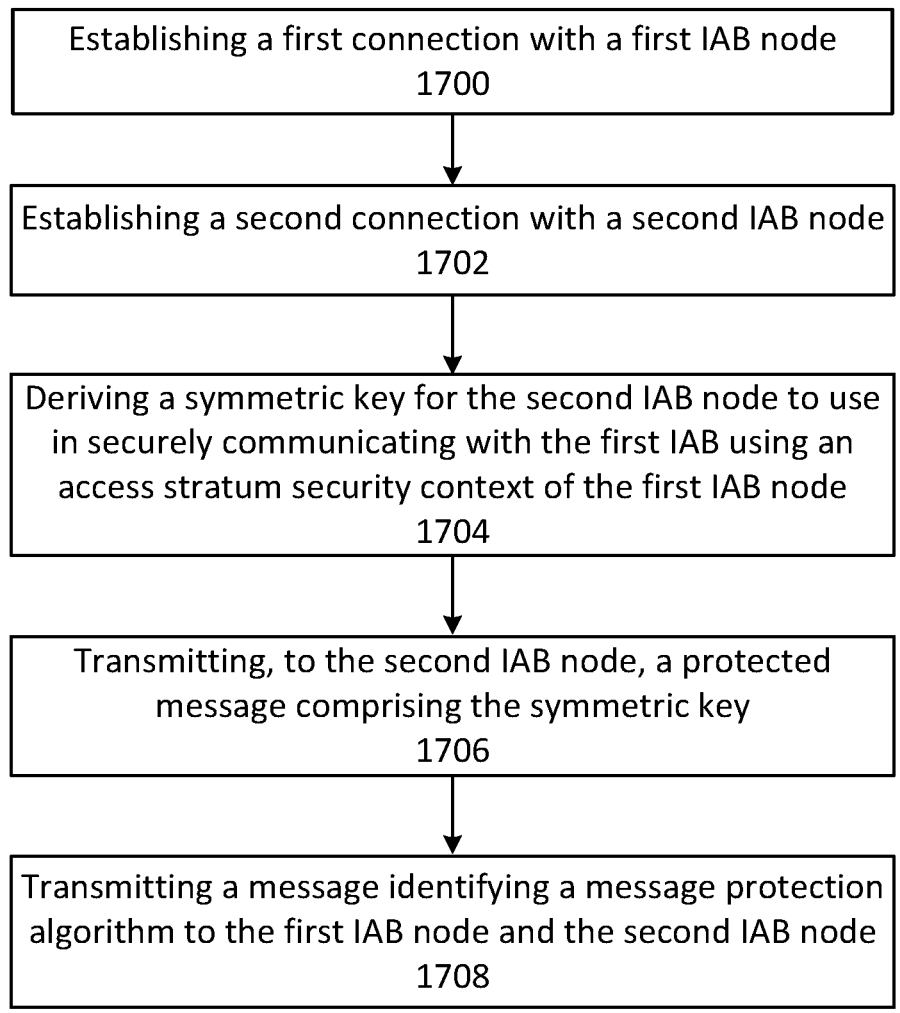
FIG. 17 is a flow chart illustrating an embodiment of a donor IAB node deriving and providing a symmetric key for a first IAB node and a second IAB node to securely communicate in accordance with some embodiments of inventive concepts.

Accordingly, a donor IAB node 1300 according to some embodiments includes a processor circuitry 1306, a transceiver circuitry 1302 coupled to the processor circuitry, and a memory circuitry 1308 coupled to the processor circuitry, the memory circuitry including machine readable program instructions that, when executed by the processor circuitry, cause the donor IAB node 1300 to perform operations depicted in FIG. 17.

IAB Node Integration

The setup and configuration (i.e. integration) for the IAB node is the first step in the operation of an IAB node. In 3GPP TR 38.874, three main phases were identified for the IAB node integration procedure. These three main phases are:

Establishing IP connectivity to the operator network
Setting up the IAB node as a DU
Providing service to end users (IAB node is operational)

Figure 1:
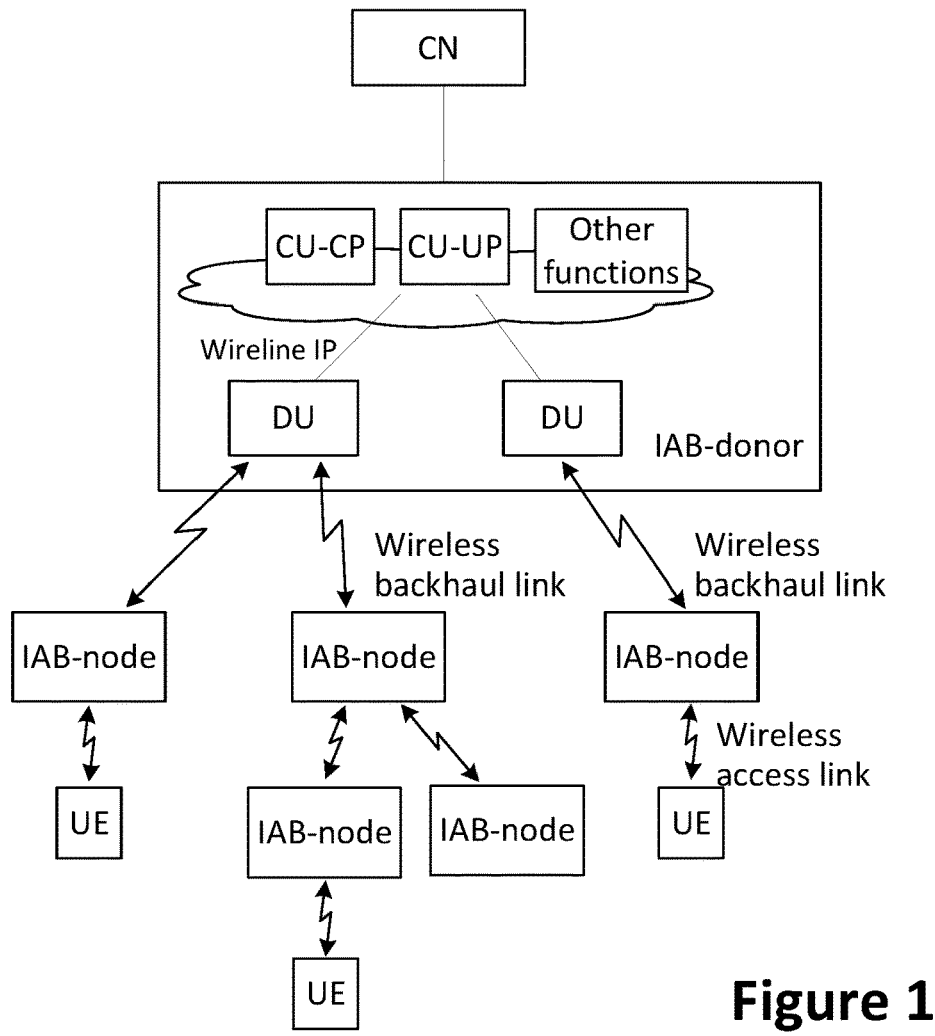
FIG. 1 illustrates a block diagram of IAB architectures.
Figure 3:
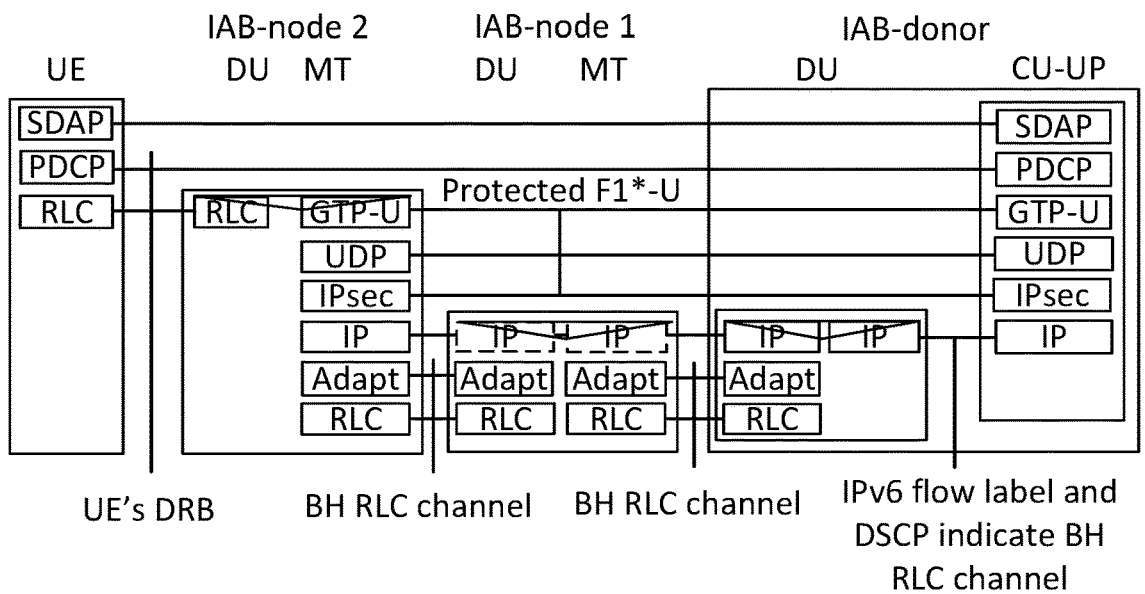
FIG. 3 is a block diagram illustrating a user plane, UP, protocol stack for the architecture illustrated in FIG. 2A.
Figure 2A:
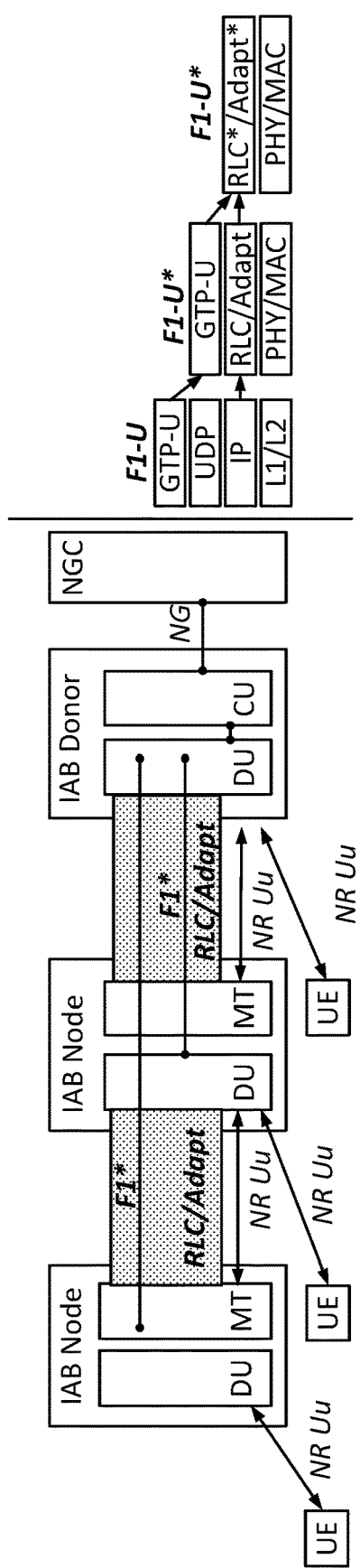
Figure 2B:
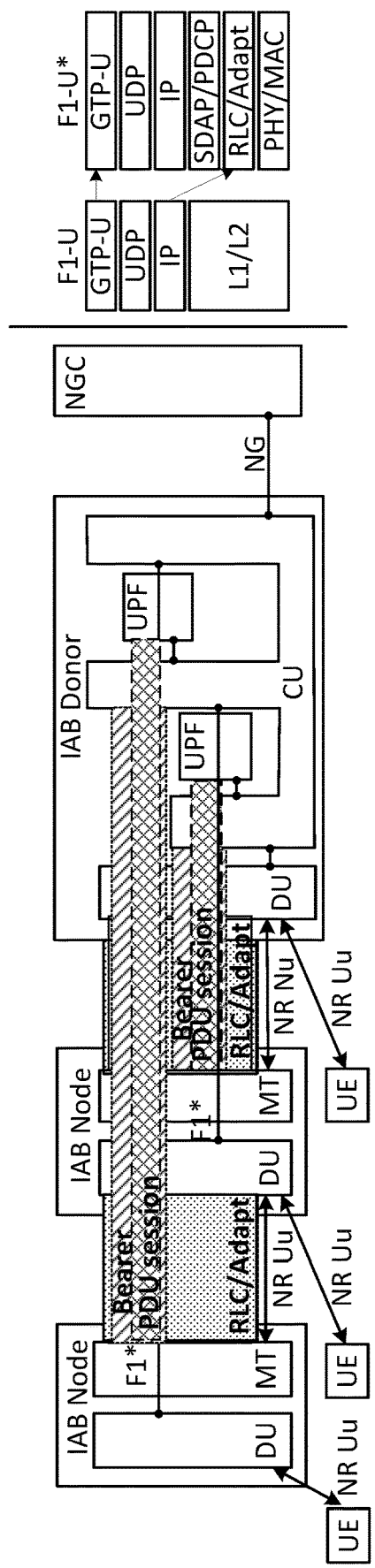
Figure 2E:
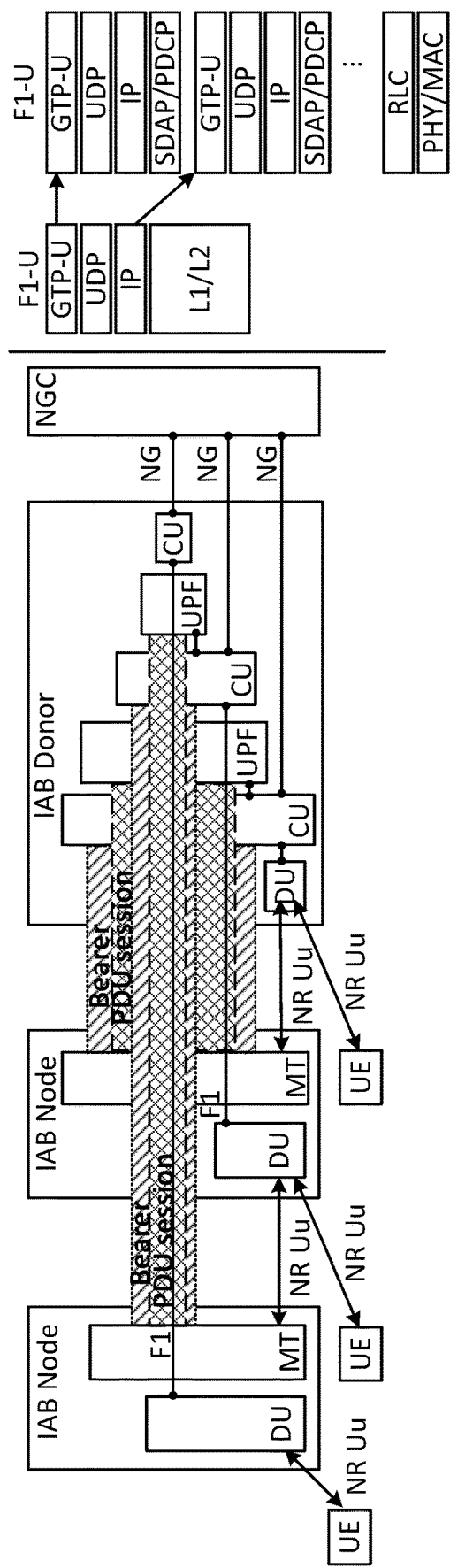
Figure 4A:
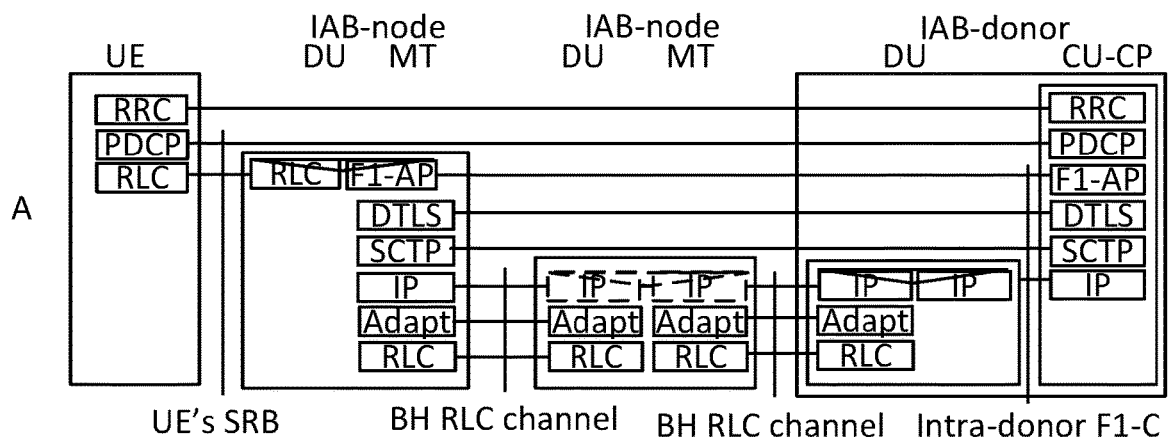
FIG. 4A is a block diagram of a control plane, CP, protocol stack for the architecture illustrated in FIG. 2A for a user equipment's radio resource control, RRC.
Figure 4B:
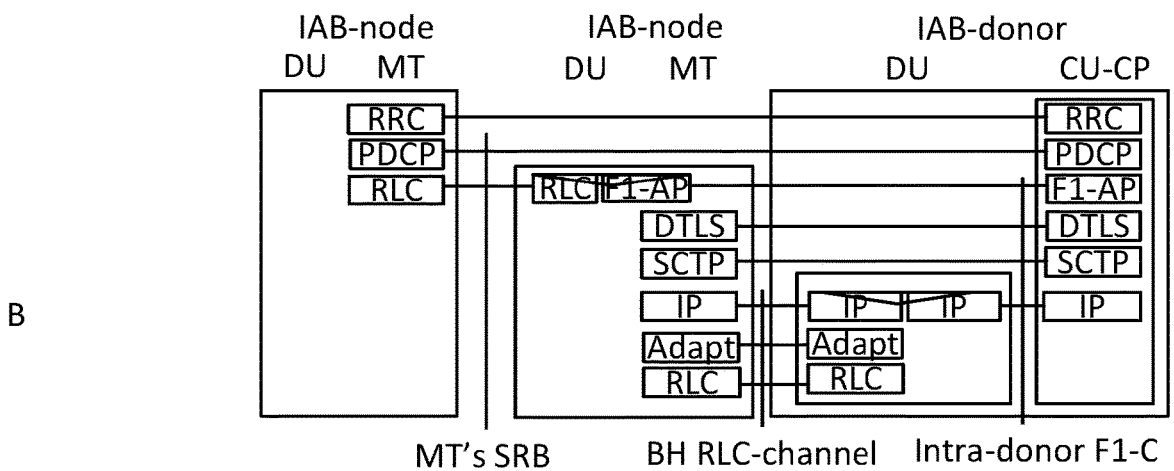
FIG. 4B is a block diagram of a CP protocol stack for the architecture illustrated in FIG. 2A for a mobile termination's RRC.
Figure 4C:
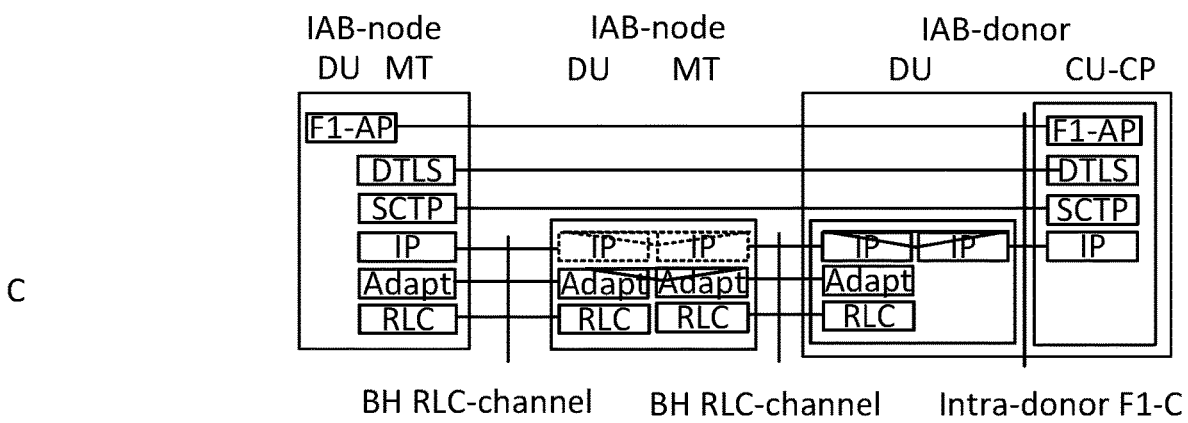
FIG. 4C is a block diagram of a control plane, CP, protocol stack for the architecture illustrated in FIG. 2A for an IAB distributed unit's, DU's, F1 application protocol, F1-AP.

The architecture illustrated in FIG. 2A can manage IP address assignment for IAB nodes internally in the radio access network, RAN, without core network, CN, involvement. The IAB node may first connect as an MT using RRC setup procedure. After RRC connection setup, the MT part of the IAB node may perform NAS level registration/authentication. No PDU session registration is required as shown in FIG. 1. After the NAS registration, UE context for the IAB node may be created in the RAN (without any PDU session resources). With this approach, there is no need to support any SMF/UPF functionality for the IAB nodes. NAS Rel-15 separates the NAS registration from the PDU session establishment, making it possible to perform registration without setting up PDU sessions and setting up a UE context in RAN without PDU session resources. Once the UE context for the IAB node has been setup in the RAN, the RAN may establish one or more backhaul bearers that can be used for IP address assignment to the IAB node.

There may be situations where the IAB node is not directly communicating with a Donor node but via other (already attached/connected) IAB nodes. The forwarding information in these other intermediate IAB nodes may be updated due to the setup of new IAB node.

After establishing connectivity to an operator's internal network, the DU (functionality of IAB node) and its cells/sectors may be configured by the operations, administration and maintenance, OAM, before the DU can send an F1 Setup Request message to its corresponding CU, i.e. IAB-CU. The architecture illustrated in FIG. 2A for IAB supports the full IP connectivity to the IAB node. This makes possible that the DU part of the IAB node may have direct IP connectivity to the OAM, instead of relying on the MT part to establish a special PDU session in the CN for OAM.

After configuring the DU part of the IAB node, the IAB node becomes operational as a DU and UEs will not be able to distinguish the IAB node from other gNBs. As such, the IAB node can start serving UEs like any other DU/gNB.

In an IAB system, a node may join a network through either the Donor node, DU, or any other IAB node DU that is already configured and operational in the network. The procedure will appear to be the same in both cases. Thus, the term gNB-DU may be used to denote the Access IAB node through which a new IAB is joining the network.

In an embodiment, the procedure for initial IAB node access may be based on the UE Initial Access signaling flow with modifications to fulfil the IAB node requirements. For activation of IAB node DU cells, the F1 Startup and cells activation procedure defined in TS 38.401 may be used with some modification.

Figure 5:
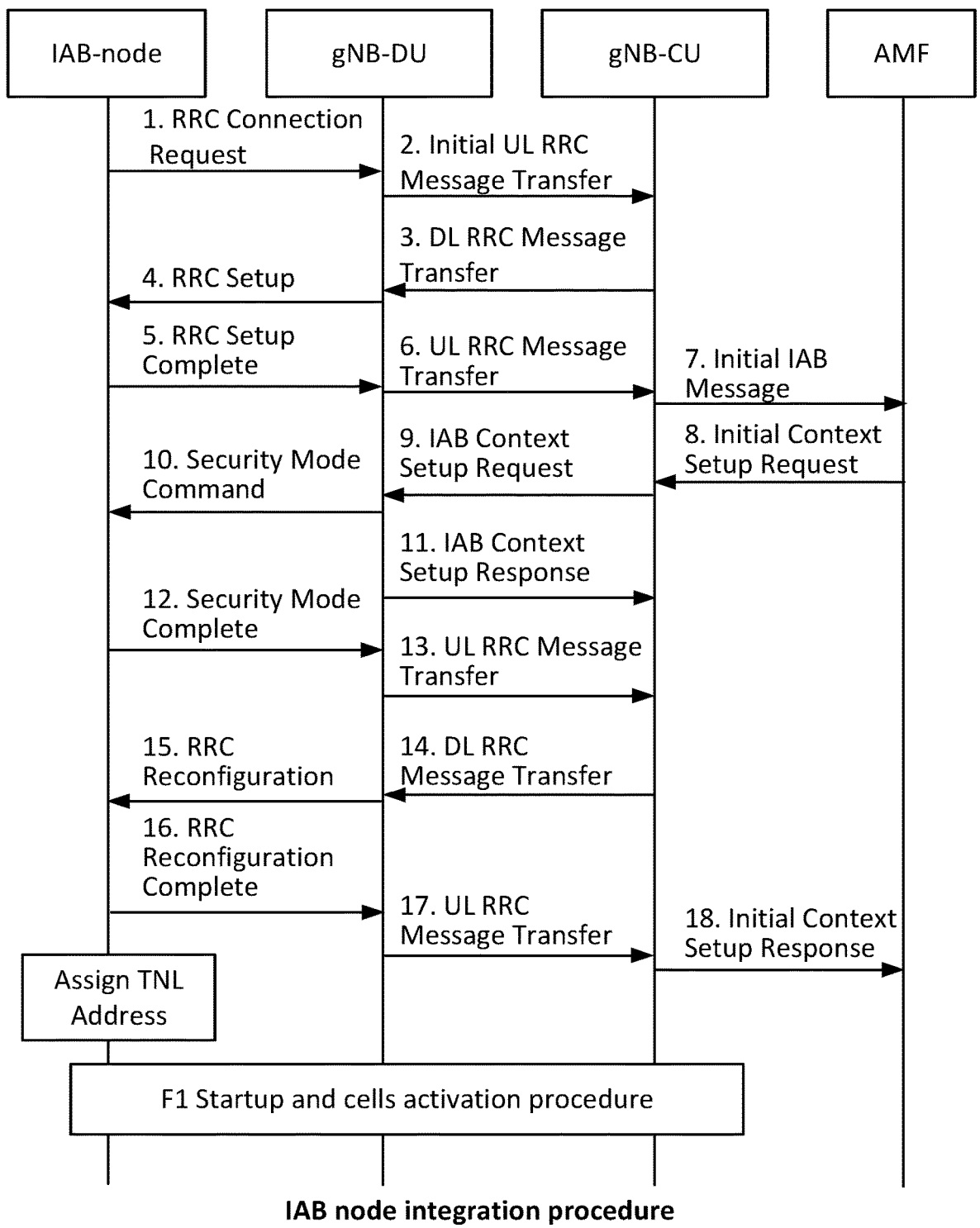
FIG. 5 is a signaling diagram illustrating an IAB node integration procedure in accordance with some embodiments of inventive concepts.

Based on the foregoing, the process for integrating the IAB node into the NG-RAN shall now be described. Turning to FIG. 5, in operation 1, the IAB node sends an RRCSetupRequest message to the gNB-DU.

In operation 2, the gNB-DU includes the RRC message and, when the IAB node is admitted, the corresponding lower layer configuration for the NR Uu interface in the INITIAL UL RRC TRANSFER message and transfers the message to the gNB-CU. The INITIAL UL RRC TRANSFER message includes the cell radio network temporary identifier, C-RNTI, allocated by the gNB-DU.

In operation 3, the gNB-CU allocates a gNB-CU UE F1AP ID for the IAB node and generates RRCSetup message towards the IAB node. The RRC message is encapsulated in the DL RRC MESSAGE TRANSFER message transmitted to the gNB-DU.

In operation 4, the gNB-DU sends the RRCSetup message to the IAB node.

In operation 5, the IAB node sends the RRC CONNECTION SETUP COMPLETE message to the gNB-DU. The single network slice selection assistance information, S-NSSAI, information element, IE, in the RRC CONNECTION SETUP COMPLETE message indicates the IAB node.

In operation 6, the gNB-DU encapsulates the RRC message in the UL RRC MESSAGE TRANSFER message and sends it to the gNB-CU.

In operation 7, the gNB-CU sends the INITIAL UE MESSAGE to the access and mobility function, AMF. The AMF may be a dedicated AMF serving only the IAB nodes.

At this point, the IAB node may perform registration (including authentication and key generation) without establishing a PDU session.

In operation 8, the AMF sends the INITIAL CONTEXT SETUP REQUEST message to the gNB-CU.

In operation 9, the gNB-CU sends the IAB CONTEXT SETUP REQUEST message to the gNB-DU to establish the IAB node context in the gNB-DU. In this message, the gNB-CU may also encapsulate the SecurityModeCommand message.

In operation 10, the gNB-DU sends the SecurityModeCommand message to the IAB node.

In operation 11, the gNB-DU sends the IAB CONTEXT SETUP RESPONSE message to the gNB-CU.

In operation 12, the IAB node responds to the SecurityModeCommand with the SecurityModeComplete message.

In operation 13, the gNB-DU encapsulates an RRC message in the UL RRC MESSAGE TRANSFER message and sends the UL RRC MESSAGE TRANSFER to the gNB-CU.

In operation 14, the gNB-CU generates the RRCReconfiguration message and encapsulates it in the DL RRC MESSAGE TRANSFER message. The RRCReconfiguration may include a configuration of one or more IAB backhaul bearers.

In operation 15, the gNB-DU sends the RRCReconfiguration message to the IAB node.

In operation 16, the IAB node sends RRCReconfigurationComplete message to the gNB-DU.

In operation 17, the gNB-DU encapsulates the RRC message in the UL RRC MESSAGE TRANSFER message and sends the UL RRC MESSAGE TRANSFER message to the gNB-CU.

In operation 18, the gNB-CU sends the INITIAL CONTEXT SETUP RESPONSE message to the AMF.

At this point, the IAB node has established one or more backhaul bearers that can be used for creating transport network layer, TNL, connectivity toward gNB-CU and obtaining a TNL address (e.g. IP address and port assignments). The IAB node may utilize the F1 Startup and Cells Activation procedures described in 3GPP TS 38.401 to activate its cells and become operational.

After activating its cells, the IAB node is operational and can serve the UEs. The UEs can connect to the IAB node via the UE Initial Access procedure described in 3GPP TS 38.401.

Backhaul-Link Failure

Figure 6:
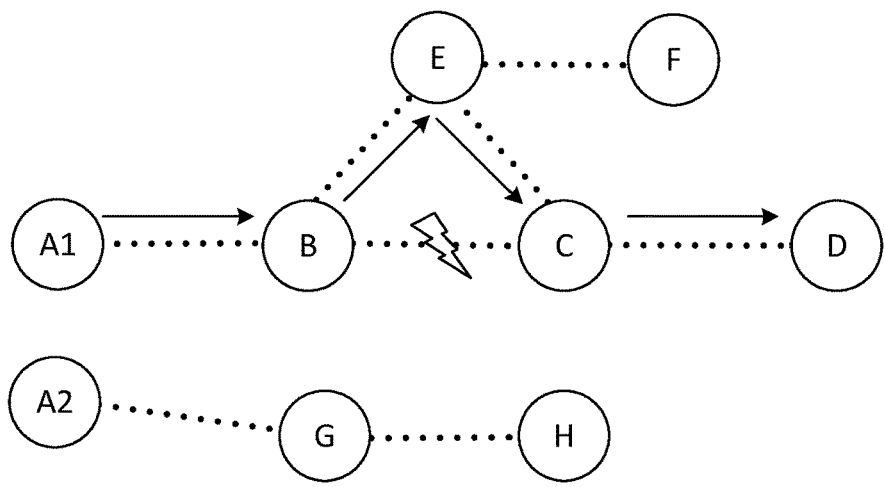
FIG. 6 is an illustration of an example of a first backhaul link failure scenario.
Figure 7:
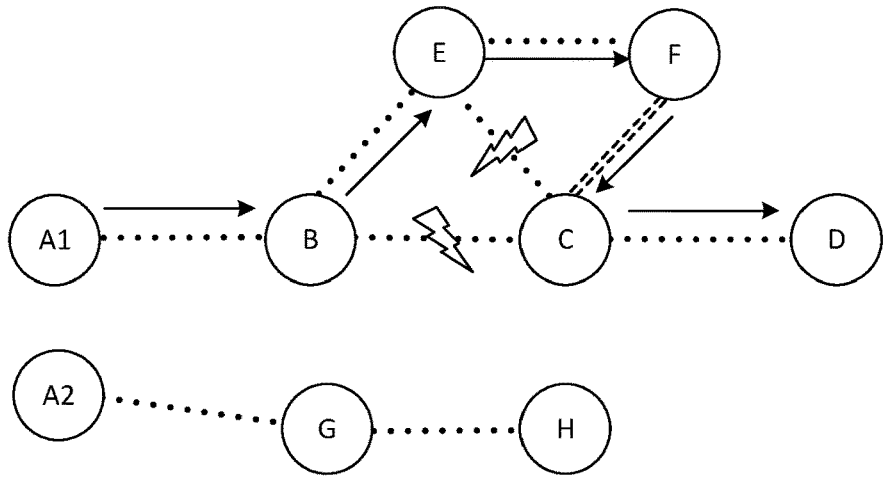
FIG. 7 is an illustration of an example of a second backhaul link failure scenario.
Figure 8:
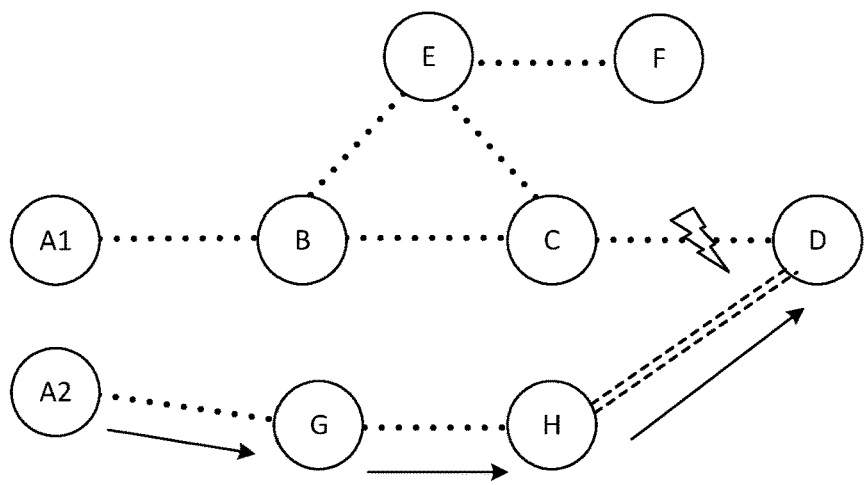
FIG. 8 is an illustration of an example of a third backhaul link failure scenario.

Backhaul-link failure may happen in IAB networks due to a variety of reasons. Turning now to FIGS. 6-8, three scenarios of backhaul-link failure are illustrated. Each of the three scenarios depicted are establishing a route between an IAB-donor node (IAB node A1 or A2) and IAB-node D after BH-link failure, where:

Nodes A1 and A2 are IAB-donor nodes; nodes B to H are IAB-nodes;

Each dashed line represents an established connection between two nodes;

The arrows represent the established route after BH-link failure.

The double dashed line represents a new established connection.

Turning to FIG. 6, the backhaul-link failure occurs between an upstream IAB-node (e.g., IAB-node C) and one of its parent IAB-nodes (e.g. IAB-node B), where the upstream IAB-node (i.e., IAB-node C) has an additional link established to another parent node (i.e., IAB-node E). The link that went from IAB-node B to IAB-node C is changed to be routed from IAB-node B to IAB-node E to IAB-node C.

Turning to FIG. 7, the backhaul-link failure occurs between an upstream IAB-node (e.g. IAB-node C) and all its parent IAB-nodes (e.g. IAB-nodes B and E). The upstream IAB-node (IAB-node C) has to reconnect to a new parent node (e.g. IAB-node F), and the connection between IAB-node F and IAB-node C is newly established.

Turning to FIG. 8, the backhaul-link failure occurs between IAB-node C and IAB-node D. IAB-node D has to reconnect to a new IAB-donor (e.g. IAB-donor A2) via a new route.

When the IAB-node observes RLF on the IAB-node's parent link, the IAB-node cannot provide further backhaul service to downstream IAB-nodes via the parent link. Additionally, child IAB-nodes cannot further serve their descendant IAB-nodes. An example of an RLF on a parent link is shown in FIG. 9, where IAB-node-5 observes RLF to its parent IAB-node-3 and subsequently cannot provide backhaul service to its child node, i.e., IAB-node-6.

The IAB-node observing RLF is aware about backhaul connectivity loss. However, the descendent IAB-nodes do not have explicit means to identify this upstream backhaul connectivity loss. In case the RLF can be recovered swiftly, as may be expected for the BH-RLF-recovery scenario illustrated in FIG. 6, there may be no need to explicitly inform the descendant IAB-nodes about the temporary BH connectivity loss. When the BH RLF cannot be recovered swiftly, it may be beneficial to release backhaul connectivity to descendant IAB-nodes so that the descendant IAB-nodes can seek to recover from the BH RLF. For this purpose, three options may be considered.

In a first option, the IAB-node DU may discontinue service. Consequently, the child nodes will determine BH RLF and perform procedures to recover. In a second option, the IAB-node DU alerts child IAB-nodes about the upstream RLF. Child IAB-nodes receiving this alert may forward the alert further downstream. Each IAB-node receiving such alert initiates BH-RLF recovery. In a third option, an IAB-node can regularly share information on, e.g., BH quality, to its child or parent IAB-nodes. In this manner, downstream or upstream RLF can be sensed without taking explicit actions.

Figure 9:
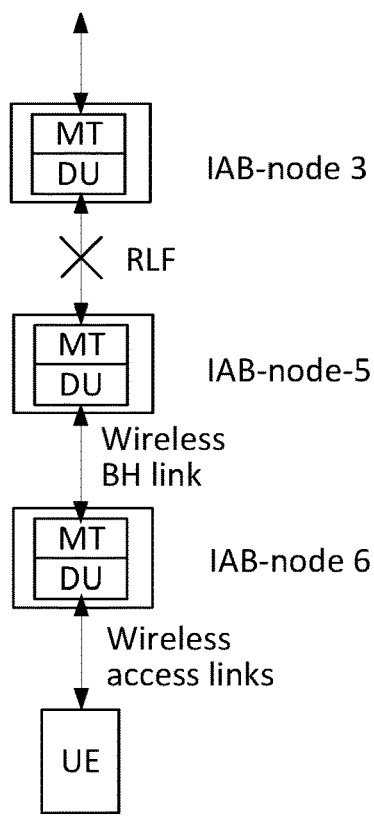
FIG. 9 is a block diagram of a topology with multiple IAB-node generations below back haul radio link failure, BH RLF.

In case a descendant IAB-node (such as IAB-node 6 in FIG. 9) can recover from such an upstream RLF by using one of the procedures described above, its DU can provide BH RLF-recovery for former ancestor nodes (such as IAB-node 5 in FIG. 9).

The recovery procedure for the backhaul failure scenarios illustrated in FIGS. 7 and 8 consists of identifying an alternate parent node and establishing/re-establishing control plane and user plane through the alternate parent node. However, identifying and attaching to an alternate node can take a significant amount of time and may not always be possible, e.g. due to lost connectivity with Donor CU or due to lack of alternative parent nodes (such as in millimeter-wave deployments). Thus, considering how the IAB network is reorganized when there is a backhaul failure in a way that minimizes interruption time of connection with the IAB-donor may need to be considered prior to a backhaul failure occurring.

Figure 10:
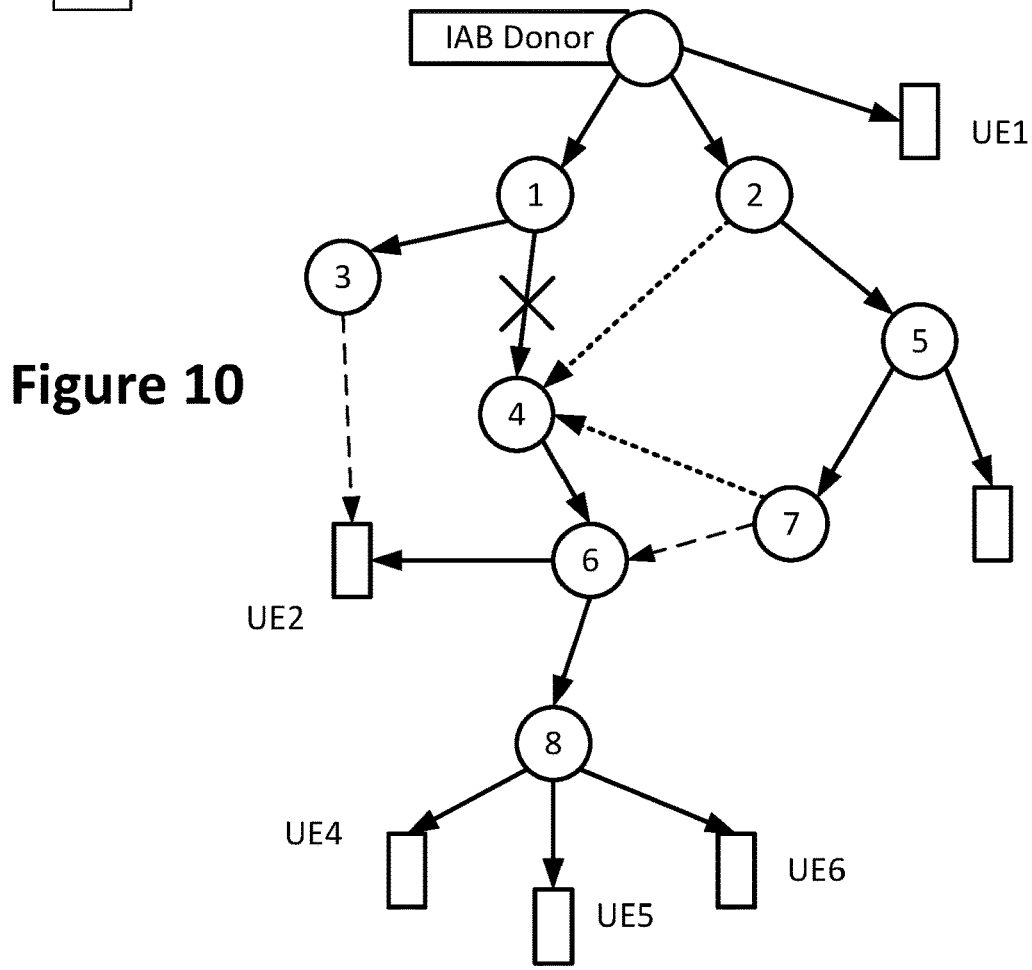
FIG. 10 is an illustration of an example for a recovery after BH RLF in an IAB network.

For example, FIG. 10 illustrates a scenario of a backhaul failure on one of the links in an IAB network. In such a scenario, many IAB-nodes and UEs may be left without a connection to the IAB-donor and may need to find alternate parent nodes when a backhaul failure occurs. Downstream IAB-nodes (e.g. IAB-nodes 4, 6 in FIG. 10) and the IAB-donor may need to be informed of the backhaul failure. Furthermore, during situations where all the affected IAB-nodes simultaneously try to find alternate parent nodes, the resulting topology may be inefficient.

One approach to consider to reduce/prevent inefficient topologies when recovering from backhaul failures is to provide information to downstream IAB-nodes regarding backhaul failure including a list of nodes that cannot serve as parent nodes due to the backhaul failure. Another approach to consider is to prepare alternative backhaul links and routes in advance (i.e. before occurrence of an RLF).

Flow Control

In multi-hop backhauls, congestion may occur on intermediate IAB-nodes. On the uplink, an intermediate IAB-node acts as a gNB-DU to child IAB-nodes and can control the amount of uplink data from child IAB-nodes and UEs by adjusting the UL grants. For example, the current transmission/scheduling mechanisms control uplink data rate to an IAB-node. This transmission/scheduling mechanism allows mitigating congestion at the intermediate IAB-node. Additional control mechanism may be needed to handle uplink data congestion.

On the downlink, an IAB-node's link capacity to a child IAB-node or a UE may be smaller than the link capacity of a backhaul link from the parent IAB-node. The DU side of the parent IAB-node may not know the downlink buffer status of the IAB-node. As a result, the ingress data rate scheduled by the parent IAB-node's DU may be larger than the egress data rate the IAB-node's DU can schedule to its child IAB-nodes and UEs, which may result in downlink data congestion and packet discard at the intermediate IAB-node. Discarding of packets at intermediate IAB-nodes may have negative consequences (e.g. may lead to TCP slow start for impacted UE flows).

End-to-end flow control (e.g. flow control via F1-U or F1*-U) may help to address packet discard at the intermediate IAB-nodes due to the downlink data congestion problem by providing a downlink delivery status from the UE's access IAB-node DU in hop-by-hop ARQ to the IAB-donor CU. End-to-end ARQ similarly can address packet discard by intermediate IAB-nodes due to downlink data congestion. However, these mechanisms may be slow to react to local congestion problems in intermediate IAB-nodes as they do not provide information to pin point at which link/node the congestion is occurring. Thus, hop-by-hop flow control may also be required together with end-to-end congestion handling.

The congested IAB-node may provide feedback information to the parent IAB-node and/or the IAB-donor. Based on this feedback, the parent IAB-node or IAB-donor may perform flow control and alleviate downlink data congestion.

The flow control feedback may include the following information:

IAB-node buffer load;
IAB-node ID, where the congestion has occurred;
Potentially other information.

The granularity of the feedback information can be, e.g., per UE radio bearer, per RLC-channel, per backhaul link, etc.

Security

Ciphering means encryption of messages. Encryption makes it infeasible for unauthorized parties to decrypt and read the original message. Integrity protection means the sender adding security token or digital signature or message authentication code (MAC) to the message that the receiver can verify, which makes it infeasible for unauthorized parties to tamper the original message without the receiver detecting the tampering. Replay protection means that the receiver keeps track of previously received messages, which makes it infeasible for unauthorized parties to trick the receiver into accepting old messages sent by valid sender.

As discussed above, the CU-DU based architecture/protocol illustrated in FIG. 2A is being used. The F1-U/C messages to the IAB nodes that contain UP/CP data are protected via NDS (e.g. IPsec, DTLS). The PDCP is terminated E2E (end to end) between the CU and the UE (or the MT part of the IAB node) which is used to protect RRC signaling. This means that CP/UP data over the interface between the access IAB node (i.e. the IAB node serving the UE or the MT part of the child IAB node) will be encrypted (and also possibly integrity protected). Thus, the communication between the donor, the IAB nodes and UEs is completely secure.

However, as discussed above in the backhaul failure recovery, flow control, etc. descriptions, there may be a need to send a control message directly between two IAB nodes. There is no specified interface between the IAB nodes (i.e. DUs). Thus, it is likely that these messages are sent by including message information in an adaptation layer header or using other lower layer mechanisms, such as a MAC CE (MAC control element), which currently does not support any security mechanisms.

The problem with including message information via adaptation layer header or using other lower layer mechanism is that the messages are not secure, and an intruder/attacker can sabotage the system. For example, an intruder can inject a fake packet that indicates a backhaul link failure and force an IAB node to perform re-establishment to another node. An intruder may inject a flow control message to an IAB node, forcing the IAB node to stop or throttle its UL transmission (and corresponding SRs/BSR) to a parent node. These examples of attacks can cause severe disturbances to the end user service.

Since the IAB node aggregates the data for several UEs (and also other IAB nodes), ensuring that control signaling such as backhaul link failure indications and flow control are secure prevents an intruder from being able to cause the loss of connection or degradation of performance of a multitude of UEs.

In LTE/NR, the MAC CE is used to perform some control signaling between a UE and a gNB/DU. However, the control signaling is limited to operations such as power control and activating secondary cells in carrier aggregation. If an intruder was able to inject a fake message, only one UE will be affected (and a loss of connection will not occur as re-establishments are triggered by the UE detecting an RLF itself and other operations such as handover or release and redirect to another frequency are performed only via RRC, which is both encrypted and integrity protected.

The lack of security during direct communication between IAB nodes can be addressed by cryptographic methods using symmetric keys that are available at both IAB nodes. Symmetric keys for the IAB nodes may be derived from the security context of the IAB nodes where one of the IAB nodes may be designated as a parent IAB node and another of the IAB nodes may be designated as a child IAB node. The symmetric keys may be derived from the security context of the parent IAB node and/or the child IAB node. Algorithms to use for protection of messages between the IAB nodes may be negotiated.

The advantages provided by the inventive concepts described herein that provide mechanisms for IAB nodes to communicate directly with each other in a secure way prevents attacks against the IAB node. The mechanisms preventing the attacks reduce the severity of consequences to end users served by the IAB nodes. Utilizing cryptographic methods using symmetric keys can be used to secure communication between IAB nodes, because the keys have been derived and distributed to the IAB nodes, and the algorithms to use have been negotiated.

To setup the secure connection between the IAB nodes, the secure signaling connections from each IAB node to the donor IAB node may be utilized. The donor IAB node can assist the IAB nodes in providing the symmetric keys to secure message between the IAB nodes, such as control messages. There are several options that may be used to establish symmetric keys between a child IAB node and a parent IAB node where the child IAB node and the parent IAB node have established AS security acting as MT towards the donor IAB node.

In a first option, the symmetric keys are derived from the AS security context of the child IAB node. The child IAB node derives the symmetric key. The donor IAB node also derives the symmetric key and then sends the symmetric key to the parent IAB node in a protected message. The protected message could be protected with the AS security context of the parent IAB node.

In a second option, the roles of the parent IAB node and the child IAB node are reversed when compared to the first option. Specifically, the parent IAB node derives the symmetric key. The donor IAB node also derives the symmetric key and then sends the symmetric key to the child IAB node in a protected message. The protected message could be protected with the AS security context of the child IAB node.

In a third option, the symmetric keys used by the child IAB node and the parent IAB node are derived from the AS security context of the parent IAB node and the child IAB node. The donor IAB node derives the symmetric key and sends the symmetric key to the child IAB node and the parent IAB node in protected messages. The messages may be protected with the AS security context of the child IAB node or the parent IAB node, respectively.

The symmetric keys may be derived using different methods. For example, one method is that the symmetric keys may be derived from the K_gNB of the parent IAB node or the child IAB node.

Another method is that the derivation may use a key derivation function. One example of a key derivation function is using a hash function. Inputs to the key derivation function may include the upper layer key from which the key is derived, freshness parameters like counters or nonces, and usage parameter e.g. FC value.

The parent IAB node and the child IAB node should also agree on an algorithm to use for protection of messages between the parent IAB node and the child IAB node. One way of agreeing on an algorithm is that the donor IAB node is aware of the AS security capabilities of both the parent IAB node and the child IAB node. The IAB donor could choose the algorithm and send a message identifying the algorithm to the parent IAB node and the child IAB node. The identification of the algorithm may be in the same message as the symmetric key or be in a separate message. The message in which the chosen algorithm is sent could be protected with the AS security context of the parent IAB node or child IAB node, respectively.

Protection of messages in this context can mean one or several of confidentiality, integrity and replay protection. The algorithm sent could be an encryption algorithm, an integrity protection algorithm (e.g. MAC) or be both of the encryption algorithm and the integrity protection algorithm.

EMBODIMENTS OF THE INVENTIVE CONCEPTS

Operations of an IAB node 1200 will now be discussed with reference to the flow chart of FIG. 14 according to some embodiments of inventive concepts. For example, modules may be stored in memory 1208 of FIG. 12, and these modules may provide instructions so that when the instructions of a module are executed by respective processing circuitry 1206, processing circuitry 1206 performs respective operations of the flow chart.

Turning to FIG. 14, operations of an IAB node shall be described. A first IAB node 1200 may be configured to set up secure communications for communications between the first IAB node and at least one second IAB node by a donor IAB node of a network. In operation 1400, the processing circuitry 1206 may establish, via transceiver circuitry 1202, a secure connection with a donor IAB node of a network. In operation 1402, the processing circuitry 1206 may receive, from the donor IAB node, a message including a symmetric key to use in securely communicating with at least one second IAB node. In operation 1404, the processing circuitry 1206 may transform a control message to be sent to the at least one second IAB node into a secure control message using the secure messaging protocol. In operation 1406, the processing circuitry 1206 may transmit, via transceiver circuitry 1202, the secure message to the at least one second IAB node. For example, consider the scenario illustrated in FIG. 10. Direct control message transmission/reception between IAB4 and IAB6 may be secured using the secure messaging protocol in accordance with the inventive concepts described herein.

A second IAB node may lose a connection to the donor IAB node in a network. When this happens, the first IAB node 1200 may act like a parent IAB node and the processing circuitry 1206 may, via transceiver circuitry 1202, establish a second connection with the donor IAB node 1300 for the second IAB node to communicate with the donor IAB node using the first IAB node 1200 as a relay nodes for the second IAB node.

The message protection algorithm may be received from the donor IAB node in a message identifying the message protection algorithm to use in transforming the second message.

The message protection algorithm may be negotiated between the first IAB node and the second IAB node. For example, turning to FIG. 15, in operation 1500, the processing circuitry 1206 may, via transceiver circuitry 1202, receive from the at least one second IAB node, a list of at least one message protection algorithm supported by the at least one second IAB node. In operation 1502, the processing circuitry 1206 may select a message protection algorithm from the list of at least one message protection algorithm to use to protect the secure message. In operation 1504, the processing circuitry 1206 may transmit, via transceiver circuitry 1202, a message selection message to the at least one second IAB node identifying the message protection algorithm selected. In operation 1506, the processing circuitry 1206 may use the message protection algorithm selected to protect the secure message.

Alternatively, the first IAB node may send a list. Turning to FIG. 16, in operation 1600, the processing circuitry 1206 may transmit, via transceiver circuitry 1202 to the at least one second IAB node, a list of at least one message protection algorithm supported by the first IAB node. In operation 1602, the processing circuitry 1206 may, via transceiver circuitry 1202, receive, from the at least one second IAB node, a message selection message identifying a message protection algorithm selected to use from the list of at least one message protection algorithm to use to protect the secure message. In operation 1604, the processing circuitry 1206 may use the message protection algorithm selected to protect the secure message.

The list of at least one message protection algorithm in the above embodiments may be a list of an encryption algorithm and an integrity protection algorithm. Using the message protection algorithm in operations 1506 and 1604 may be using the encryption algorithm and the integrity protection algorithm to protect the secure message. In other embodiments, using the message protection algorithm in operations 1506 and 1604 may be using the integrity protection algorithm to protect the secure message. In further embodiments, using the message protection algorithm in operations 1506 and 1604 may be using the encryption algorithm to protect the secure message. In yet other embodiments, the list of at least one message protection algorithm in the above embodiments may be a list of at least one encryption algorithm. In further embodiments, the list of at least one message protection algorithm in the above embodiments may be a list of at least one integrity protection algorithm.

In another embodiment, the message protection algorithm may be a protocol using a hash function.

Operations of a donor IAB node 1300 (implemented using the structure of FIG. 13) will now be discussed with reference to the flow chart of FIG. 17 according to some embodiments of inventive concepts. For example, modules may be stored in memory 1308 of FIG. 13, and these modules may provide instructions so that when the instructions of a module are executed by respective donor IAB node processing circuitry 1306, processing circuitry 1306 performs respective operations of the flow chart.

Turning to FIG. 17, in operation 1700 the processing circuitry 1306 may establish, via the transceiver circuitry 1302, a first connection with a first IAB node. In operation 1702, the processing circuitry 1306 may establish, via the transceiver circuitry 1302, a second connection with a second IAB node. In an embodiment, the processing circuitry 1306 may establish the connection with an IAB node by establishing a second connection with another IAB node for the IAB node to communicate with the donor IAB node 1300 using the second connection with the other IAB node acting as a relay node for the IAB node. For example, assume that first IAB node connection to the donor IAB node 1300 has broken such that the first IAB node can no longer be directly connected to the donor IAB node. The processing circuitry 1306 may establish another connection with the first IAB node by establishing a connection, via the transceiver circuitry 1302, with the second IAB node to relay messages between the donor IAB node 1300 and the first IAB node.

In operation 1704, the processing circuitry 1306 may derive a symmetric key for the second IAB node to use in securely communicating with the first IAB node using an access stratum, AS, security context of the first IAB node. In one embodiment, the processing circuitry 1306 may derive the symmetric key using a K_gNB key of the first IAB node. In another embodiment, the processing circuitry 1306 may derive the symmetric key using a key derivation function. For example, the key derivation function may be a hash function.

In operation 1706, the processing circuitry 1306 may, via the transceiver circuitry 1302 transmit to the second IAB node a protected message comprising the symmetric key.

In operation 1708, the processing circuitry 1306 may, via the transceiver circuitry 1302, transmit a message identifying a message protection algorithm to the first IAB node and the second IAB node for the first IAB node and the second IAB node to use to protect messages sent between the first IAB node and the second IAB node. In one embodiment, the message identifying a message protection algorithm may be a message identifying one of an encryption algorithm and an integrity protection algorithm. In other embodiments, the message identifying a message protection algorithm may be a message identifying at least one encryption algorithm. In further embodiments, the message identifying a message protection algorithm may be a message identifying at least one integrity protection algorithm.

Various operations from the flow chart of FIG. 17 may be optional with respect to some embodiments of donor IAB nodes and related methods. For example, operations of block 1708 of FIG. 17 may be optional with respect to some embodiments of donor IAB nodes and related methods.

ABBREVIATIONS

At least some of the following abbreviations may be used in this disclosure. If there is an inconsistency between abbreviations, preference should be given to how it is used above. If listed multiple times below, the first listing should be preferred over any subsequent listing(s).

| Abbreviation | Explanation |
| --- | --- |
| 3GPP | 3rd Generation Partnership Project |
| IAB | Integrated Access Backhaul |
| CN | Core Network |
| CU | Central Unit |
| DU | Distributed Unit |
| CP | Control Plane |
| UP | User Plane |
| UE | User Equipment |
| PDCP | Packet Data Convergence Protocol |
| RLC | Radio Link Control |
| MAC | Medium Access Control |
| MAC | Message Authentication Code |
| SDU | Service Data Unit |
| PDU | Protocol Data Unit |
| SR | Scheduling Request |
| BSR | Buffer Status Report |
| UL | Uplink |
| DL | Downlink |
| ACK | Acknowledgement |
| NACK | Negative ACK |
| RRC | Radio Resource Control |
| SIB | System Information Block |

REFERENCES

[1] 3GPP TS 38.401
[2] 3GPP TR 38.8743

LISTING OF EXAMPLE EMBODIMENTS

Example Embodiments are discussed below. Reference numbers/letters are provided in parenthesis by way of example/illustration without limiting example embodiments to particular elements indicated by reference numbers/letters.

Embodiment 1. A method by a first integrated access and backhaul, IAB, node (1200) for securely communicating with at least one second IAB node, the method comprising:
  establishing (1400) a connection with a donor IAB node (1300) of a network;
  receiving (1402), from the donor IAB node, a first message including a symmetric key to use in securely communicating with the at least one second IAB node;
  transforming (1404) a second message into a secure message using the symmetric key and a message protection algorithm; and
  transmitting (1406) the secure message to the at least one second IAB node.

Embodiment 2. The method of Embodiment 1, wherein the first IAB node is a parent node, the method further comprising establishing a second connection with the donor IAB node of the network for the at least one second IAB node to communicate with the donor IAB node using the first IAB node as a relay node for the at least one second IAB node.

Embodiment 3. The method of any of Embodiments 1-2, further comprising:
receiving, from the donor IAB node, a message identifying the message protection algorithm to use in transforming the second message.

Embodiment 4. The method of any of Embodiments 1-2, further comprising:
receiving (1500), from the at least one second IAB node, a list of at least one message protection algorithm supported by the at least one second IAB node;
selecting (1502) a message protection algorithm from the list of at least one message protection algorithm to use to protect the secure message;
transmitting (1504) a message selection message to the at least one second IAB node identifying the message protection algorithm selected; and
using (1506) the message protection algorithm selected to protect the secure message.

Embodiment 5. The method of any of Embodiments 1-2, further comprising:
transmitting (1600), to the at least one second IAB node, a list of at least one message protection algorithm supported by the first IAB node;
receiving (1602), from the at least one second IAB node, a message selection message identifying a message protection algorithm selected to use from the list of at least one message protection algorithm to use to protect the secure message; and
using (1604) the message protection algorithm selected to protect the secure message.

Embodiment 6. The method of any of Embodiments 4-5 wherein the list of at least one message protection algorithm comprises a list of an encryption algorithm and an integrity protection algorithm.

Embodiment 7. The method of Embodiment 6 wherein using the message protection algorithm to protect the secure message comprises using the encryption algorithm and the integrity protection algorithm to protect the secure message.

Embodiment 8. The method of Embodiment 6 wherein using the message protection algorithm to protect the secure message comprises using the integrity protection algorithm to protect the secure message.

Embodiment 9. The method of any of Embodiments 4-5 wherein the list of at least one message protection algorithm comprises a list of at least one integrity protection algorithm and using the message protection algorithm to protect the secure message comprises using one of the at least one integrity protection algorithm to protect the secure message.

Embodiment 10. The method of any of Embodiments 4-5 wherein the list of at least one message protection algorithm comprises a list of at least one encryption algorithm and using the message protection algorithm to protect the secure message comprises using one of the at least one encryption algorithm to protect the secure message.

Embodiment 11. The method of Embodiment 1 wherein the message protection algorithm comprises a protocol using a hash function.

Embodiment 12. An integrated access and backhaul, IAB, node (1200) for securely communicating with at least one second IAB node and adapted to perform operations according to Embodiments 1-11.

Embodiment 13. An integrated access and backhaul, IAB, node (1200) for securely communicating with at least one second IAB node, the IAB node (1200) comprising:
a processor (1206); and
a memory (1208) storing instructions that, when executed by the processor (1206), cause the IAB node (1200) to perform operations according to Embodiments 1-11.

Embodiment 14. A computer program comprising program code to be executed by processing circuitry (1206) of an integrated access and backhaul, IAB, node (1200) configured to operate in a communication network, whereby execution of the program code causes the IAB node (1200) to perform operations according to any of Embodiments 1-11.

Embodiment 15. A computer program product comprising a non-transitory storage medium including program code to be executed by processing circuitry (1206) of an integrated access and backhaul, IAB, (1200) configured to operate in a communication network, whereby execution of the program code causes the IAB node (1200) to perform operations according to any of Embodiments 1-11.

Embodiment 16. A method by a donor integrated access and backhaul, IAB, node (1300) of a network for securely communicating with a first IAB node and a second IAB node, the method comprising:
establishing (1700) a first connection with the first IAB node;
establishing (1702) a second connection with the second IAB node;
deriving (1704) a symmetric key for the second IAB node to use in securely communicating with the first IAB node using an access stratum, AS, security context of the first IAB node; and
transmitting (1706), to the second IAB node, a protected message comprising the symmetric key.

Embodiment 17. The method of Embodiment 16 wherein deriving the symmetric key comprises deriving the symmetric key using a K_gNB key of the first IAB node.

Embodiment 18. The method of Embodiment 16 wherein deriving the symmetric key comprises deriving the symmetric key using a key derivation function.

Embodiment 19. The method of Embodiment 18 wherein the key derivation function comprises a hash function.

Embodiment 20. The method of any of Embodiments 16-19 wherein establishing the first connection with the first IAB node comprises establishing the first connection with the first IAB node using the second IAB node as a relay node.

Embodiment 21. The method of any of Embodiments 16-20 further comprising:
transmitting a message identifying a message protection algorithm to the first IAB node and the second IAB node for the first IAB node and the second IAB node to use to protect messages sent between the first IAB node and the second IAB node.

Embodiment 22. The method of Embodiment 21 wherein the message identifying a message protection algorithm comprises a message identifying one of an encryption algorithm and an integrity protection algorithm.

Embodiment 23. The method of Embodiment 21 wherein the message identifying a message protection algorithm comprises a message identifying at least one integrity protection algorithm.

Embodiment 24. The method of Embodiment 21 wherein the message identifying a message protection algorithm comprises a message identifying at least one encryption algorithm.

Embodiment 25. A donor integrated access and backhaul, IAB, node (1300) for securely communicating with at least one second IAB node and adapted to perform operations according to Embodiments 16-24.

Embodiment 26. A donor integrated access and backhaul, IAB, node (1300) for securely communicating with a first IAB node and a second IAB node, the donor IAB node (1300) comprising:
- a processor (1306); and
- a memory (1308) storing instructions that, when executed by the processor (1306), cause the donor IAB node (1300) to perform operations according to Embodiments 16-24.

Embodiment 27. A computer program comprising program code to be executed by processing circuitry (1306) of a donor integrated access and backhaul, IAB, node (1300) configured to operate in a communication network, whereby execution of the program code causes the donor IAB node (1300) to perform operations according to any of Embodiments 16-24.

Embodiment 28. A computer program product comprising a non-transitory storage medium including program code to be executed by processing circuitry (1306) of a donor integrated access and backhaul, IAB, (1300) configured to operate in a communication network, whereby execution of the program code causes the donor IAB node (1300) to perform operations according to any of Embodiments 16-24.

ADDITIONAL EXPLANATION

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features and advantages of the enclosed embodiments will be apparent from the following description.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

The term unit may have conventional meaning in the field of electronics, electrical devices and/or electronic devices and may include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

In the above-description of various embodiments of present inventive concepts, it is to be understood that the terminology used herein is for the purpose of describing particular embodiments only and is not intended to be limiting of present inventive concepts. Unless otherwise defined, all terms (including technical and scientific terms) used herein have the same meaning as commonly understood by one of ordinary skill in the art to which present inventive concepts belong. It will be further understood that terms, such as those defined in commonly used dictionaries, should be interpreted as having a meaning that is consistent with their meaning in the context of this specification and the relevant art and will not be interpreted in an idealized or overly formal sense unless expressly so defined herein.

When an element is referred to as being "connected", "coupled", "responsive", or variants thereof to another element, it can be directly connected, coupled, or responsive to the other element or intervening elements may be present. In contrast, when an element is referred to as being "directly connected", "directly coupled", "directly responsive", or variants thereof to another element, there are no intervening elements present. Like numbers refer to like elements throughout. Furthermore, "coupled", "connected", "responsive", or variants thereof as used herein may include wirelessly coupled, connected, or responsive. As used herein, the singular forms "a", "an" and "the" are intended to include the plural forms as well, unless the context clearly indicates otherwise. Well-known functions or constructions may not be described in detail for brevity and/or clarity. The term "and/or" (abbreviated "/") includes any and all combinations of one or more of the associated listed items.

It will be understood that although the terms first, second, third, etc. may be used herein to describe various elements/operations, these elements/operations should not be limited by these terms. These terms are only used to distinguish one element/operation from another element/operation. Thus a first element/operation in some embodiments could be termed a second element/operation in other embodiments without departing from the teachings of present inventive concepts. The same reference numerals or the same reference designators denote the same or similar elements throughout the specification.

As used herein, the terms "comprise", "comprising", "comprises", "include", "including", "includes", "have", "has", "having", or variants thereof are open-ended, and include one or more stated features, integers, elements, steps, components or functions but does not preclude the presence or addition of one or more other features, integers, elements, steps, components, functions or groups thereof. Furthermore, as used herein, the common abbreviation "e.g.", which derives from the Latin phrase "exempli gratia," may be used to introduce or specify a general example or examples of a previously mentioned item, and is not intended to be limiting of such item. The common abbreviation "i.e.", which derives from the Latin phrase "id est," may be used to specify a particular item from a more general recitation.

Example embodiments are described herein with reference to block diagrams and/or flowchart illustrations of computer-implemented methods, apparatus (systems and/or devices) and/or computer program products. It is understood that a block of the block diagrams and/or flowchart illustrations, and combinations of blocks in the block diagrams and/or flowchart illustrations, can be implemented by computer program instructions that are performed by one or more computer circuits. These computer program instructions may be provided to a processor circuit of a general purpose computer circuit, special purpose computer circuit, and/or other programmable data processing circuit to produce a machine, such that the instructions, which execute via the processor of the computer and/or other programmable data processing apparatus, transform and control transistors, values stored in memory locations, and other hardware components within such circuitry to implement the functions/acts specified in the block diagrams and/or flowchart block or blocks, and thereby create means (functionality) and/or structure for implementing the functions/acts specified in the block diagrams and/or flowchart block(s).

These computer program instructions may also be stored in a tangible computer-readable medium that can direct a computer or other programmable data processing apparatus to function in a particular manner, such that the instructions stored in the computer-readable medium produce an article of manufacture including instructions which implement the functions/acts specified in the block diagrams and/or flowchart block or blocks. Accordingly, embodiments of present inventive concepts may be embodied in hardware and/or in software (including firmware, resident software, microcode, etc.) that runs on a processor such as a digital signal processor, which may collectively be referred to as "circuitry," "a module" or variants thereof.

It should also be noted that in some alternate implementations, the functions/acts noted in the blocks may occur out of the order noted in the flowcharts. For example, two blocks shown in succession may in fact be executed substantially concurrently or the blocks may sometimes be executed in the reverse order, depending upon the functionality/acts involved. Moreover, the functionality of a given block of the flowcharts and/or block diagrams may be separated into multiple blocks and/or the functionality of two or more blocks of the flowcharts and/or block diagrams may be at least partially integrated. Finally, other blocks may be added/inserted between the blocks that are illustrated, and/or blocks/operations may be omitted without departing from the scope of inventive concepts. Moreover, although some of the diagrams include arrows on communication paths to show a primary direction of communication, it is to be understood that communication may occur in the opposite direction to the depicted arrows.

Many variations and modifications can be made to the embodiments without substantially departing from the principles of the present inventive concepts. All such variations and modifications are intended to be included herein within the scope of present inventive concepts. Accordingly, the above disclosed subject matter is to be considered illustrative, and not restrictive, and the examples of embodiments are intended to cover all such modifications, enhancements, and other embodiments, which fall within the spirit and scope of present inventive concepts. Thus, to the maximum extent allowed by law, the scope of present inventive concepts are to be determined by the broadest permissible interpretation of the present disclosure including the examples of embodiments and their equivalents, and shall not be restricted or limited by the foregoing detailed description.

The invention claimed is:

1. A method by a first integrated access and backhaul (IAB) node for securely communicating with at least one second IAB node, the method comprising:
establishing a connection with a donor IAB node of a network;
receiving, from the donor IAB node, a first message including a symmetric key to use in securely communicating with the at least one second IAB node;
generating, by the first IAB node, a second message comprising control information related to a state or operation of the first IAB node;
transforming the second message into a secure message using the symmetric key and a message protection algorithm; and
transmitting the secure message to the at least one second IAB node.

2. The method of claim 1, wherein the first IAB node is a parent node, the method further comprising establishing a second connection with the donor IAB node of the network for the at least one second IAB node to communicate with the donor IAB node using the first IAB node as a relay node for the at least one second IAB node.

3. The method of claim 1, further comprising:
receiving, from the donor IAB node, a message identifying the message protection algorithm to use in transforming the second message.

4. The method of claim 1, further comprising:
receiving, from the at least one second IAB node, a list of at least one message protection algorithm supported by the at least one second IAB node;
selecting the message protection algorithm from the list of at least one message protection algorithm to use to protect the secure message;
transmitting a message selection message to the at least one second IAB node identifying the message protection algorithm selected; and
using the message protection algorithm selected to protect the secure message.

5. The method of claim 4 wherein the list of at least one message protection algorithm comprises a list of an encryption algorithm and/or an integrity protection algorithm.

6. The method of claim 5 wherein using the message protection algorithm to protect the secure message comprises using the encryption algorithm and the integrity protection algorithm to protect the secure message.

7. The method of claim 5 wherein using the message protection algorithm to protect the secure message comprises using the integrity protection algorithm to protect the secure message.

8. The method of claim 4 wherein the list of at least one message protection algorithm comprises a list of at least one integrity protection algorithm and using the message protection algorithm to protect the secure message comprises using one of the at least one integrity protection algorithm to protect the secure message.

9. The method of claim 4 wherein the list of at least one message protection algorithm comprises a list of at least one encryption algorithm and using the message protection algorithm to protect the secure message comprises using one of the at least one encryption algorithm to protect the secure message.

10. The method of claim 1, further comprising:
transmitting, to the at least one second IAB node, a list of at least one message protection algorithm supported by the first IAB node;
receiving, from the at least one second IAB node, a message selection message identifying the message protection algorithm selected to use from the list of at least one message protection algorithm to use to protect the secure message; and
using the message protection algorithm selected to protect the secure message.

11. The method of claim 1 wherein the message protection algorithm comprises a protocol using a hash function.

12. An integrated access and backhaul (IAB) node for securely communicating with at least one second IAB node, the IAB node comprising:
a processor; and
a memory storing instructions that, when executed by the processor, cause the IAB node to perform operations comprising:
establishing a connection with a donor IAB node of a network;
receiving, from the donor IAB node, a first message including a symmetric key to use in securely communicating with the at least one second IAB node;
generating, by the IAB node, a second message comprising control information related to a state or operation of the IAB node;
transforming the second message into a secure message using the symmetric key and a message protection algorithm; and
transmitting the secure message to the at least one second IAB node.

13. The IAB node of claim 12, wherein the IAB node is a parent node, wherein the memory contains further instructions that when executed by the processor, cause the IAB node to perform further operations comprising establishing a second connection with the donor IAB node of the network for the at least one second IAB node to communicate with the donor IAB node using the IAB node as a relay node for the at least one second IAB node.

14. The IAB node of claim 12, wherein the memory contains further instructions that when executed by the processor, cause the IAB node to perform further operations comprising:
receiving, from the donor IAB node, a message identifying the message protection algorithm to use in transforming the second message.

15. The IAB node of claim 12, wherein the memory contains further instructions that when executed by the processor, cause the IAB node to perform further operations comprising:
receiving, from the at least one second IAB node, a list of at least one message protection algorithm supported by the at least one second IAB node;
selecting the message protection algorithm from the list of at least one message protection algorithm to use to protect the secure message;
transmitting a message selection message to the at least one second IAB node identifying the message protection algorithm selected; and
using the message protection algorithm selected to protect the secure message.

16. The IAB node of claim 15 wherein the list of at least one message protection algorithm comprises a list of an encryption algorithm and/or an integrity protection algorithm and using the message protection algorithm to protect the secure message comprises using the encryption algorithm and the integrity protection algorithm to protect the secure message.

17. The IAB node of claim 16 wherein using the message protection algorithm to protect the secure message comprises using the integrity protection algorithm to protect the secure message.

18. The IAB node of claim 15 wherein the list of at least one message protection algorithm comprises a list of at least one integrity protection algorithm and using the message protection algorithm to protect the secure message comprises using one of the at least one integrity protection algorithm to protect the secure message.

19. The IAB node of claim 15 wherein the list of at least one message protection algorithm comprises a list of at least one encryption algorithm and using the message protection algorithm to protect the secure message comprises using one of the at least one encryption algorithm to protect the secure message.

20. The IAB node of claim 12, wherein the memory contains further instructions that when executed by the processor, cause the IAB node to perform further operations comprising:
transmitting, to the at least one second IAB node, a list of at least one message protection algorithm supported by the IAB node;
receiving, from the at least one second IAB node, a message selection message identifying the message protection algorithm selected to use from the list of at least one message protection algorithm to use to protect the secure message; and
using the message protection algorithm selected to protect the secure message.

* * * * *